(12) United States Patent
Suzuki et al.

(10) Patent No.: US 9,374,518 B2
(45) Date of Patent: Jun. 21, 2016

(54) FOCUS DETECTION SENSOR

(71) Applicant: CANON KABUSHIKI KAISHA, Tokyo (JP)

(72) Inventors: Satoshi Suzuki, Hiratsuka (JP); Yukihiro Kuroda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/284,274

(22) Filed: May 21, 2014

(65) Prior Publication Data

US 2014/0347505 A1 Nov. 27, 2014

(30) Foreign Application Priority Data

May 24, 2013 (JP) .................................. 2013-110186

(51) Int. Cl.
*H04N 5/232* (2006.01)
*G03B 13/36* (2006.01)
*G03B 7/28* (2006.01)
*H04N 5/361* (2011.01)
*H04N 5/3745* (2011.01)
*H04N 5/225* (2006.01)
*H04N 5/369* (2011.01)
*G03B 7/0997* (2014.01)
*G03B 19/12* (2006.01)

(52) U.S. Cl.
CPC .............. *H04N 5/23212* (2013.01); *G03B 7/28* (2013.01); *G03B 13/36* (2013.01); *H04N 5/2254* (2013.01); *H04N 5/23245* (2013.01); *H04N 5/361* (2013.01); *H04N 5/3696* (2013.01); *H04N 5/37452* (2013.01); *G03B 7/09976* (2015.01); *G03B 19/12* (2013.01); *G03B 2217/002* (2013.01)

(58) Field of Classification Search
CPC .......... H04N 5/23212; H04N 5/23245; H04N 5/2254; H04N 5/37452; H04N 5/361; H04N 5/3696; G03B 13/00
See application file for complete search history.

(56) References Cited

U.S. PATENT DOCUMENTS

| 8,149,324 B2 * | 4/2012 | Oikawa .......................... 348/349 |
| 2011/0085066 A1 * | 4/2011 | Sugawa et al. ................. 348/302 |
| 2012/0050598 A1 * | 3/2012 | Kinugasa et al. .............. 348/327 |

FOREIGN PATENT DOCUMENTS

| JP | 10-333021 A | 12/1998 |
| JP | 2006-251777 A | 9/2006 |

* cited by examiner

*Primary Examiner* — Jason Flohre
(74) *Attorney, Agent, or Firm* — Canon USA Inc. IP Division

(57) ABSTRACT

A focus detection sensor and an image pickup system are provided. The focus detection sensor includes photoelectric conversion units converting light into charges, memory units storing the charges generated by the photoelectric conversion units as pixel signals, transfer units transferring the charges generated by the photoelectric conversion units to the memory units, reset units resetting the photoelectric conversion units and the memory units, a detection unit outputting a first detection signal in accordance with the pixel signals stored in the memory units, and a mode switching determination unit performing switching from a first operation mode in which the transfer units are set to a transfer state in a charge accumulation period after the photoelectric conversion units are reset to a second operation mode in which the transfer units are set to a non-transfer state.

16 Claims, 16 Drawing Sheets

REGISTER MAP

| | REGISTER NAME | | | | | |
|---|---|---|---|---|---|---|
| | ⋮ | | | | | |
| REGISTERS FOR LINE SENSOR L1 → | MODE1 | TSDATA1 | START1 | STOP1 | ········ | TR1 |
| REGISTERS FOR LINE SENSOR L2 → | MODE2 | TSDATA2 | START2 | STOP2 | ········ | TR2 |
| REGISTERS FOR LINE SENSOR L3 → | MODE3 | TSDATA3 | START3 | STOP3 | ········ | TR3 |
| | ⋮ | | | | | |

FIG. 10

| ACCUMULATION TIME Ts | MODE SWITCHING DETERMINATION VALUE |
|---|---|
| 0 < Ts ≤ T1 | Vt1 |
| T1 < Ts ≤ T2 | Vt2 |
| T2 < Ts ≤ T3 | Vt3 |
| T3 < Ts ≤ T4 | Vt4 |
| T4 < Ts ≤ T5 | Vt5 |
| T5 < Ts ≤ Tstop | Vt6 |

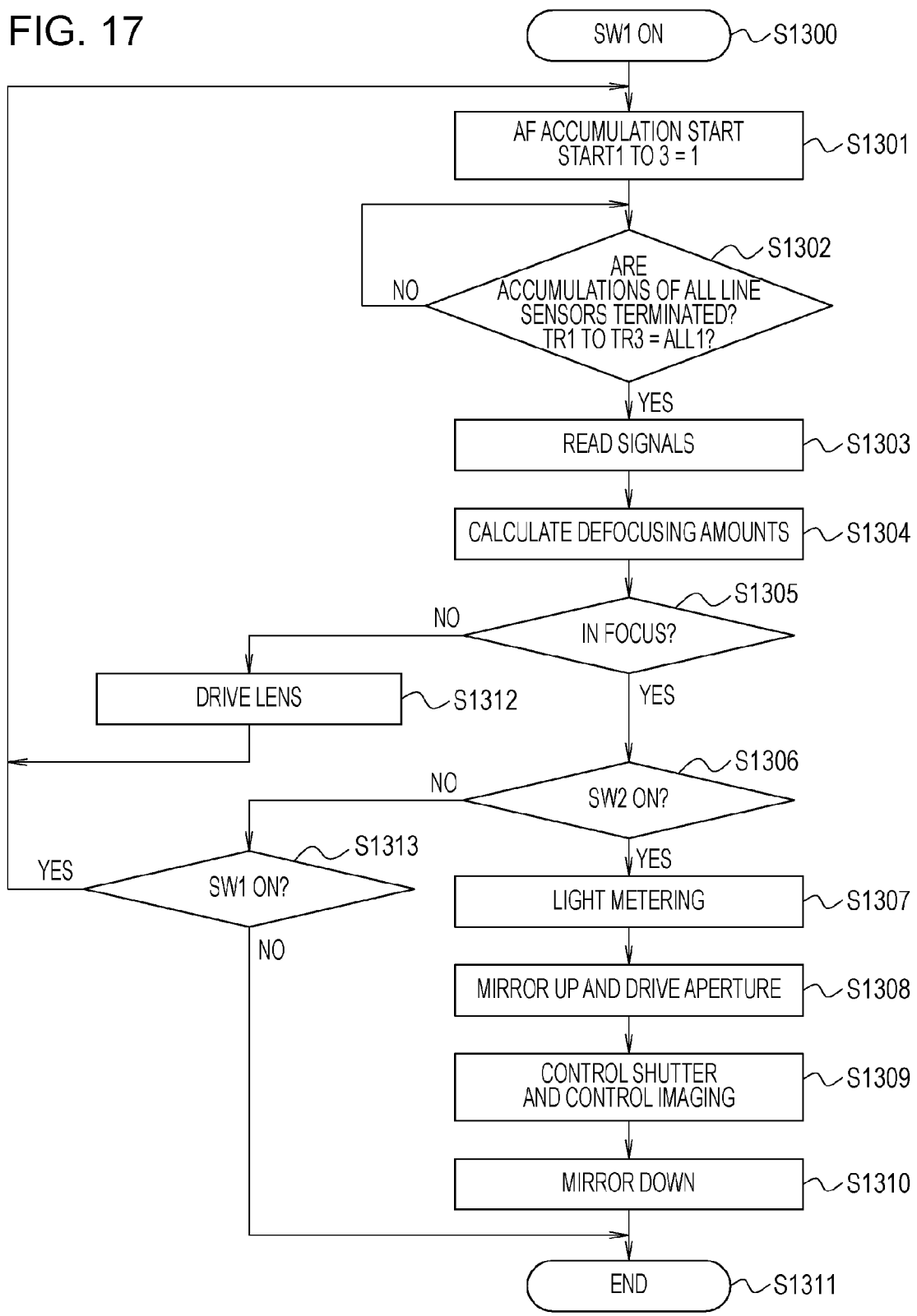

FOCUS DETECTION SENSOR

BACKGROUND

1. Field of the Disclosure

The present disclosure relates to a focus detection sensor, an image pickup system, and a method for driving the focus detection sensor.

2. Description of the Related Art

In general, an image pickup apparatus having a function of autofocus (hereinafter referred to as "AF") in which a focal distance of an image pickup lens is controlled in accordance with a state of detection of focus of an object detected by a focus detection sensor including photoelectric conversion elements so that the object is automatically focused has been widely used. Furthermore, control of charge accumulation periods and gains to be output of photoelectric conversion elements included in a focus detection sensor in accordance with brightness and contrast of an object is widely performed.

For example, Japanese Patent Laid-Open No. 2006-251777 discloses a focus detection sensor using line sensors including a plurality of photoelectric conversion elements (pixels). In the focus detection sensor, the line sensors are divided into a plurality of regions and accumulation is stopped when a difference (contrast) between a largest value and a smallest value of pixel signals exceeds a target value for each region. Furthermore, Japanese Patent Laid-Open No. 10-333021 discloses arrangement of a monitor sensor in the vicinity of a pair of line sensors used for focus detection and control of an accumulation (integration) time of the pair of line sensors performed in accordance with a signal supplied from the monitor sensor.

However, in the configuration disclosed in Japanese Patent Laid-Open No. 2006-251777, charges obtained by photoelectric conversion in the pixels are constantly transferred to an accumulation circuit, and therefore, noise generated in the accumulation circuit during accumulation is also accumulated with the charges obtained by the photoelectric conversion. When the accumulation period is long, an amount of the generated noise is increased, and therefore, adverse effect of a noise component on a result of the accumulation is not negligible and an error may occur as a result of focus detection.

Meanwhile, in the configuration disclosed in Japanese Patent Laid-Open No. 10-333021, since the accumulation control is performed in accordance with outputs of the monitor sensor disposed separately from the line sensors, charges obtained by photoelectric conversion performed in pixels during accumulation are not transferred to a memory circuit and a monitor circuit. Accordingly, noise to be generated may be reduced by resetting the memory circuit and the monitor circuit until the accumulation in the pixels is terminated. However, in Japanese Patent Laid-Open No. 10-333021, since the monitor sensor is disposed in the vicinity of the line sensors, when a plurality of line sensors are to be disposed, the monitor sensor restricts layout of the line sensors and arrangement of the monitor sensor is also restricted to perform light metering in high accuracy. As a result, an area of a chip of the focus detection sensor is increased, and therefore, cost is increased and miniaturization of an optical device including the focus detection sensor may not be attained.

SUMMARY

According to an embodiment of the present invention, there is provided a focus detection sensor including a plurality of photoelectric conversion units configured to convert light into charges, a plurality of memory units configured to store the charges generated by the photoelectric conversion units as pixel signals, a plurality of transfer units configured to transfer the charges generated by the photoelectric conversion units to the memory units, a plurality of reset units configured to reset the photoelectric conversion units and the memory units, a detection unit configured to output a first detection signal in accordance with the pixel signals stored in the memory units, and a mode switching determination unit configured to perform switching from a first operation mode in which the transfer units are set to a transfer state in a charge accumulation period after the photoelectric conversion units are reset to a second operation mode in which the transfer units are set to a non-transfer state.

Further features of the present invention will become apparent from the following description of exemplary embodiments with reference to the attached drawings.

BRIEF DESCRIPTION OF THE DRAWINGS

FIG. 10 is a diagram illustrating a mode switching determination value table.

FIG. 17 is a flowchart illustrating an example of operation of the camera.

DESCRIPTION OF THE EMBODIMENTS

First Exemplary Embodiment

Figure 1:
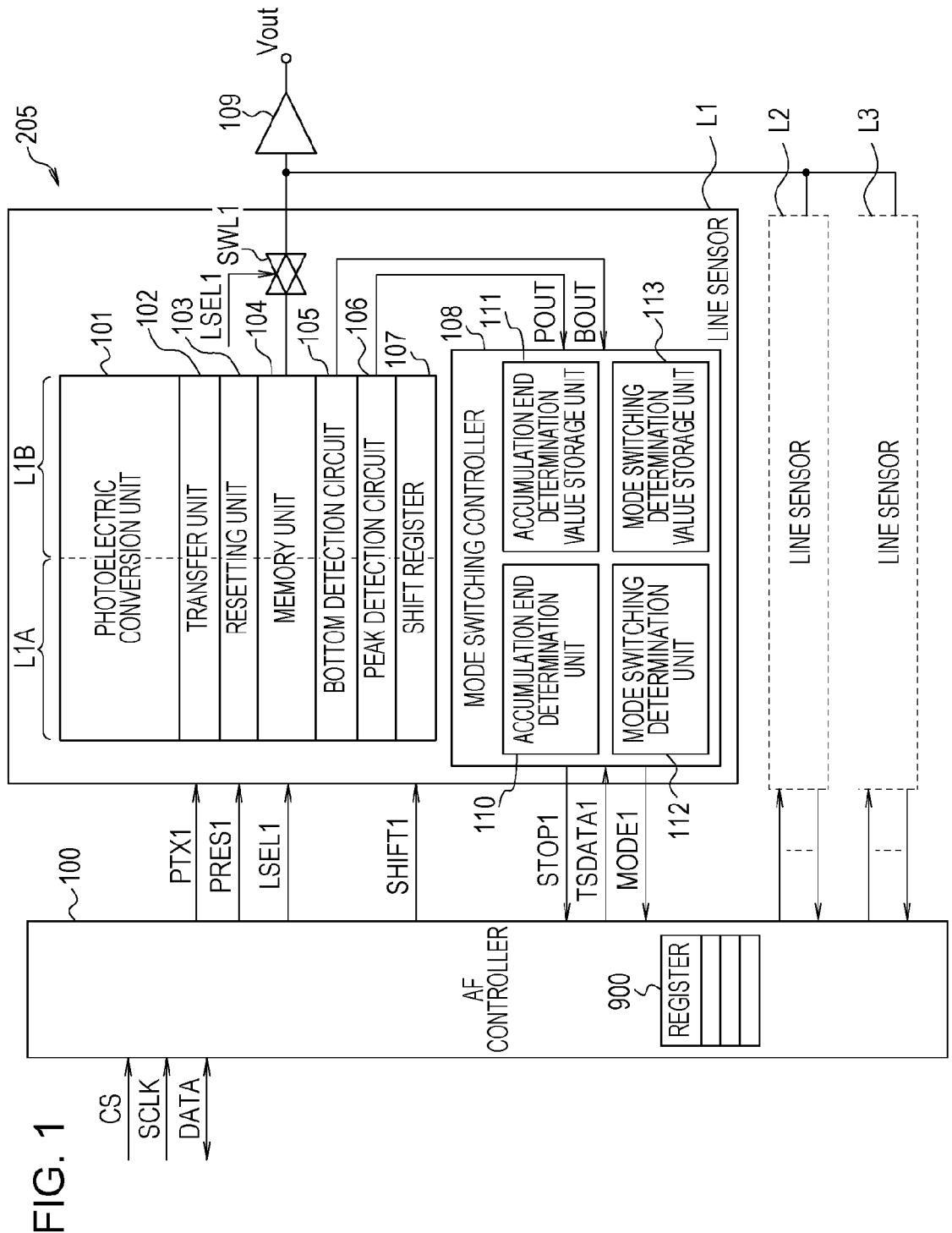
FIG. 1 is a block diagram illustrating a configuration of a focus detection sensor.

FIG. 1 is a block diagram illustrating a configuration of a focus detection sensor 205 according to a first exemplary embodiment of the present invention. The focus detection sensor 205 includes three line sensors L1 to L3 and an autofocus detection controller (hereinafter referred to as an AF controller) 100 which controls the line sensors L1 to L3, and an output amplifier 109. In FIG. 1, only the line sensor L1 among the line sensors L1 to L3 is described in detail so that description and understanding are facilitated. Note that the other line sensors L2 and L3 also have configurations the same as that of the line sensor L1. As with signal lines extending from the AF controller 100 to the line sensor L1, signal lines also extend from the AF controller 100 to the line sensors L2 and L3 in the same way.

The line sensor L1 includes photoelectric conversion units 101, transfer units 102, resetting units 103, memory units 104, a bottom detection circuit 105, a peak detection circuit 106, a shift register 107, a mode switching controller 108, and a line selection switch SWL1. The line sensor L1 includes two sensor arrays L1A and L1B for phase difference detection. The two sensor arrays L1A and L1B have the same number of pixels (approximately 30 to 80, for example) in the corresponding photoelectric conversion units 101. The sensor arrays L1A and L1B output an image signal A and an image signal B, respectively, so that a difference of phases is detected.

In the line sensor L1, the photoelectric conversion units 101 generate signal charges obtained through photoelectric conversion performed by the pixels for individual pixels. The memory units 104 each of which includes a capacitance and an amplifier, not illustrated, temporarily store the signal charges obtained through the photoelectric conversion performed by the photoelectric conversion units 101, convert the signal charges into voltages, and amplify the voltages by predetermined gains. The transfer units 102 are controlled to be in a transfer state or a non-transfer state by a signal PTX1 controlled by the AF controller 100. In the transfer state, the transfer units 102 transfer the signal charges obtained through the photoelectric conversion performed by the pixels of the photoelectric conversion units 101 to the memory units 104, whereas in the non-transfer state, the transfer units 102 do not perform the transfer to the memory units 104. The resetting units 103 reset voltages of the photoelectric conversion units 101 and the memory units 104 to a predetermined voltage Vrst in accordance with a signal PRES1 supplied from the AF controller 100.

The peak detection circuit (detection unit) 106 receives outputs of the memory units 104 of the pixels of the line sensor L1 and detects and outputs a largest one of integral values stored in the memory units 104. The bottom detection circuit (detection unit) 105 receives outputs of the memory units 104 of the pixels of the line sensor L1 and detects and outputs a smallest one of the integral values stored in the memory units 104. When receiving a signal SHIFT1 from the AF controller 100, the shift register 107 selects signals output from the memory units 104 for individual pixels, and successively outputs the signals output from the memory units 104 to the output amplifier 109 while the line selection switch SWL1 is in an on state in accordance with a signal LSEL1. The output amplifier 109 amplifies an input signal by an appropriate gain so as to output a pixel signal Vout.

The mode switching controller 108 which includes an accumulation end determination unit 110 and a mode switching determination unit 112 performs accumulation control of the line sensor L1 and control of switching between first and second operation modes. The mode switching controller 108 further includes an accumulation end determination value storage unit 111 and a mode switching determination value storage unit 113 which store respective determination values required for the corresponding control operations. The AF controller 100 which includes a register 900 controls accumulation operations of the line sensors L1 to L3 and an operation of reading image signals in accordance with values set in the register 900.

Figures 2, 3:
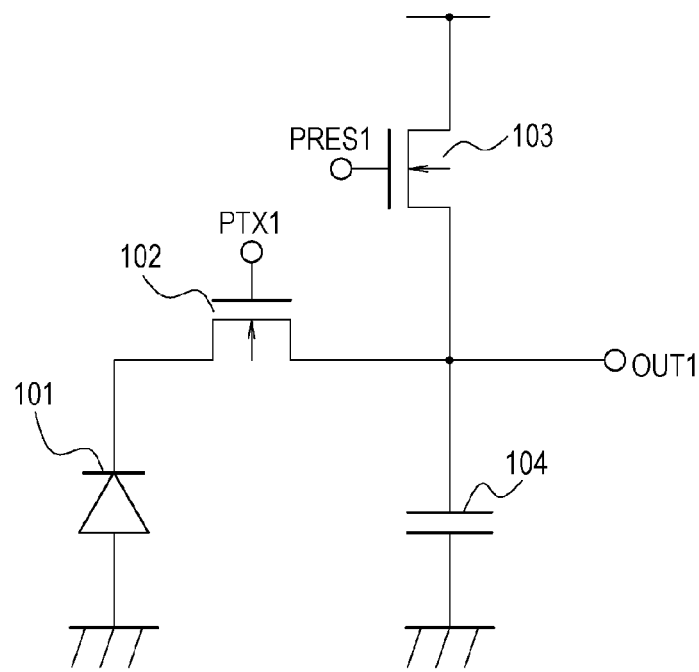
FIG. 2 is a diagram illustrating registers included in the focus detection sensor.
FIG. 3 is a diagram of a circuit for one pixel in one of line sensors included in the focus detection sensor.

FIG. 2 is a diagram illustrating a portion of a register map of the register 900. The register 900 includes accumulation control registers for the line sensors L1 to L3 as illustrated in the register map of FIG. 2. Registers MODE1 to MODE3 store mode setting values of accumulation operations of the line sensors L1 to L3, respectively. In a first operation mode, 0 is set and in a second operation mode, 1 is set. Registers TSDATA1 to TSDATA3 store accumulation end times of the line sensors L1 to L3, respectively. The registers START1 to START3 are used to start the accumulation operations, and when 1 is set, the AF controller 100 starts the accumulation operations of the line sensors L1 to L3. The registers STOP1 to STOP3 are used to stop the accumulation operations, and when 1 is set, the AF controller 100 stops the accumulation operations of the line sensors L1 to L3. Registers TR1 to TR3 correspond to flags representing completion of the accumulation operations, and 1 is set when the accumulation operations are terminated. The register 900 accepts external reading and external writing (from a main controller of a camera, for example) through serial communication using terminals CS, SCLK, and DATA which are communication terminals included in the AF controller 100. Since values of the register 900 are externally set, operation of the focus detection sensor 205 may be controlled.

Next, the first and second operation modes will be described with reference to FIG. 3 and FIGS. 4A and 4B. FIG. 3 is an equivalent circuit diagram illustrating the photoelectric conversion unit 101, the transfer unit 102, the resetting unit 103, and the memory unit 104 of the line sensor L1 for one pixel. Each of the sensor arrays L1A and 11B of FIG. 1 has a plurality of pixels. Specifically, each of the sensor arrays L1A and L1B includes a plurality of photoelectric conversion units 101, a plurality of transfer units 102, a plurality of resetting units 103, and a plurality of memory units 104. The photoelectric conversion unit 101 corresponds to a photodiode, for example, and performs photoelectric conversion so as to convert light into a charge. The memory unit 104 stores a charge generated by the photoelectric conversion unit 101 as a pixel signal and outputs a pixel signal OUT1. The transfer unit 102 transfers the charge generated by the photoelectric conversion unit 101 to the memory unit 104. The resetting unit 103 resets the photoelectric conversion unit 101 and the memory unit 104. NMOS transistors are used as the transfer unit 102 and the resetting unit 103, and the transistors enter an on state when gate voltages are brought to a high level whereas the transistors enter an off state when the gate voltages are brought to a low level. Although the memory unit 104 is represented as a capacitance in FIG. 3, the memory unit 104 may be a parasitic capacitance of a gate electrode which is an input terminal of a buffer amplifier when the buffer amplifier is provided in the following stage. Alternatively, the memory unit 104 may be a sampling circuit provided in the following stage of the buffer amplifier.

Figure 4A:
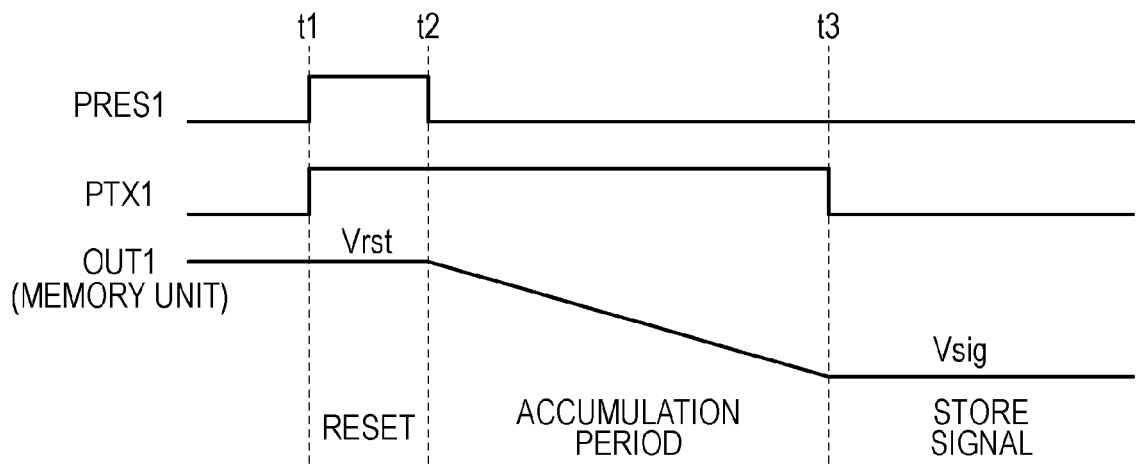
FIGS. 4A and 4B are timing charts illustrating operation modes of the line sensors.
Figure 4B:
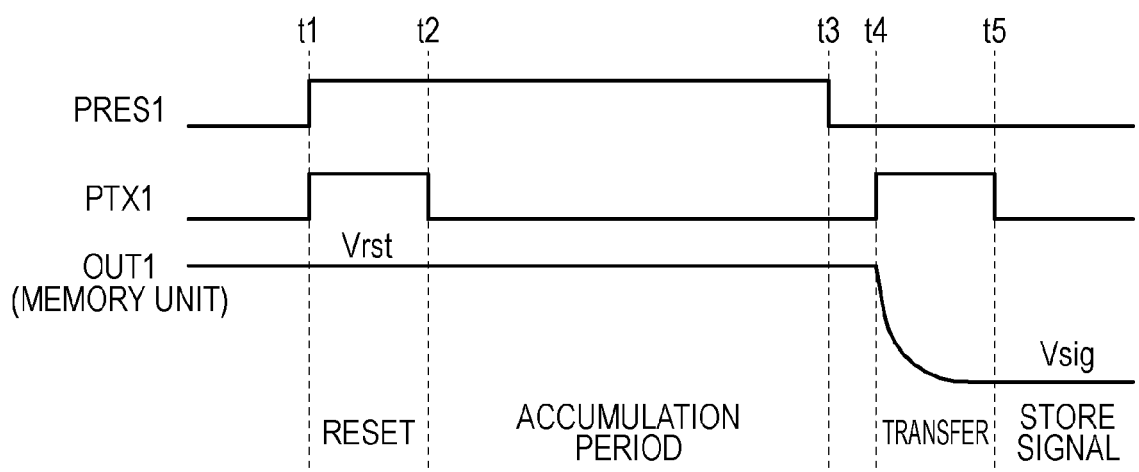

FIG. 4A is a timing chart of the first operation mode and FIG. 4B is a timing chart of the second operation mode. Note that the signal PRES1 and the signal PTX1 are digital signals, and a high level corresponds to a certain voltage level and a low level corresponds to a ground level. The signal OUT1 represents an analog signal and schematically represents voltage variation of the memory unit 104.

First, the first operation mode will be described with reference to FIG. 4A. In the first operation mode, when the signals PRES1 and PTX1 are brought to a high level at a timing t1, the resetting units 103 and the transfer units 102 are turned on, and the photoelectric conversion units 101 and the memory units 104 of all the pixels are reset to a predetermined voltage Vrst. By the resetting operation, the signal OUT1 corresponds to the voltage Vrst.

Next, at a timing t2, the signal PRES1 is brought to a low level. At the timing t2, the transfer units 102 are in a transfer state, and therefore, signal charges obtained by photoelectric conversion performed by the photoelectric conversion units 101 are constantly transferred to the memory units 104 which integrate the signal charges. When the integration of the signal charges is started by the memory units 104, the signals OUT1 have voltages corresponding to magnitudes of the signal charges. The peak detection circuit 106 detects a largest value of the pixel signals OUT1 of the pixels of the line sensor L1 and outputs the largest value as a peak signal POUT. The bottom detection circuit 105 detects a smallest value of the pixel signals OUT1 of the pixels of the line sensor L1 and outputs the smallest value as a bottom signal BOUT.

Subsequently, at a timing t3, the signal PTX1 is brought to a low level so that the transfer units 102 are set to a non-transfer state and the integration operations of the memory units 104 are stopped. The memory units 104 store signals Vsig until the shift registers 107 select the signals Vsig. Specifically, in the first operation mode, the transfer units 102 are in a transfer state and the memory units 104 integrates the signal charges during a charge accumulation period from the timing t2 to the timing t3.

Next, the second operation mode will be described with reference to FIG. 4B. In the second operation mode, when the signals PRES1 and PTX1 are brought to a high level at the timing t1, the resetting units 103 and the transfer units 102 are turned on, and the photoelectric conversion units 101 and the memory units 104 of the pixels are reset to a predetermined voltage Vrst. By the resetting operation, the signals OUT1 correspond to the voltage Vrst.

Subsequently, at the timing t2, the signal PTX1 is brought to a low level so that the transfer units 102 are set to a non-transfer state. At the timing t2, the photoelectric conversion units 101 start integration of signal charges obtained by the photoelectric conversion performed by the photoelectric conversion units 101. At the timing t2, since the resetting units 103 are in an on state, the memory units 104 are reset to a predetermined reset voltage Vrst. Therefore, since the signals OUT1 are not changed from the reset voltage Vrst, the peak detection circuit 106 and the bottom detection circuit 105 do not function.

Next, after the signal PRES1 is brought to a low level at the timing t3, the signal PTX1 is brought to a high level at a timing t4 so that the transfer units 102 are set to a transfer state. The signal charges integrated in the photoelectric conversion units 101 are transferred to the memory units 104. The memory units 104 store signals Vsig until the memory unit 104 are selected by the shift registers 107.

Specifically, in the second operation mode, during a charge accumulation period from the timing t2 to the timing t4, the transfer units 102 are in the non-transfer state and the photoelectric conversion units 101 integrate the signal charges. In the second operation mode, during the charge accumulation period from the timing t2 to the timing t4, charges are not transferred from the photoelectric conversion units 101 to the memory units 104. Furthermore, the memory units 104 are repeatedly reset until the timing t3 immediately before the charge accumulation period from the timing t2 to the timing t4 is terminated and the signal charges are transferred from the photoelectric conversion units 101 to the memory units 104. Therefore, in the second operation mode, noise generated in the memory units 104 during the charge accumulation period from the timing t2 to the timing t4 is not superimposed on the signal charges, and therefore, the signals Vsig having less noise may be obtained. In the charge accumulation period from the timing t2 to the timing t3, the signal PRES1 may be in a low level.

Figure 5:
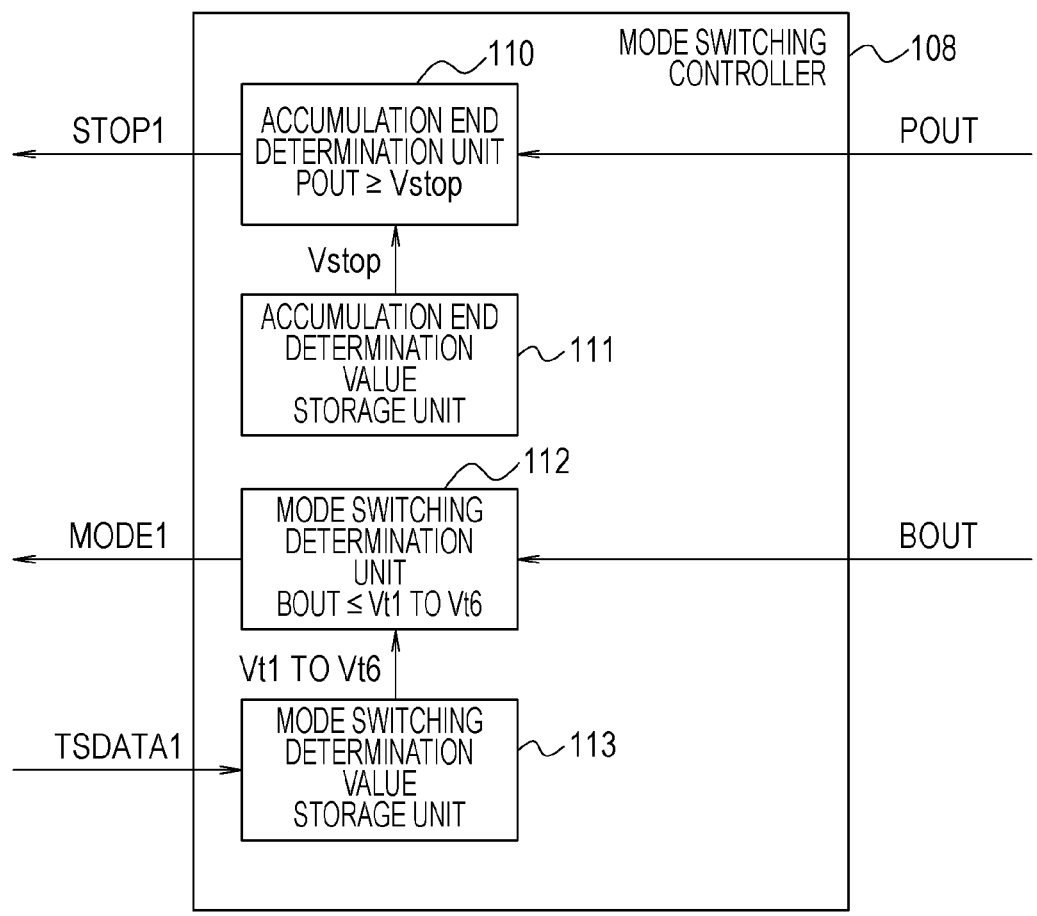
FIG. 5 is a block diagram illustrating an example of a configuration of a mode switching controller according to a first exemplary embodiment.

FIG. 5 is a block diagram illustrating an example of a configuration of the mode switching controller 108. The mode switching controller 108 includes the accumulation end determination unit 110, the accumulation end determination value storage unit 111, the mode switching determination unit 112, and the mode switching determination value storage unit 113. The accumulation end determination value storage unit 111 stores an accumulation end determination value Vstop and a value equal to a value output from the line sensor L1 at a time of pixel saturation. Specifically, the accumulation end determination value Vstop is used for determining that the line sensor L1 is in a pixel saturation state when the peak signal POUT reaches the accumulation determination value Vstop and terminating the accumulation. The accumulation end determination unit 110 includes a comparator not illustrated. The comparator has one input terminal which receives the peak signal (second detection signal) POUT output from the peak detection circuit 106 and the other input terminal which receives the accumulation end determination value Vstop. When a comparison result represents that the peak signal POUT is equal to or larger than the accumulation end determination value Vstop, the accumulation end determination unit 110 outputs 1 as a signal STOP1 and otherwise outputs 0. The value of the signal STOP1 is written in a register STOP1 of the register 900. The AF controller 100 stops the accumulation operation by controlling the transfer units 102 when 1 is set in the accumulation end register STOP1.

Figure 6:
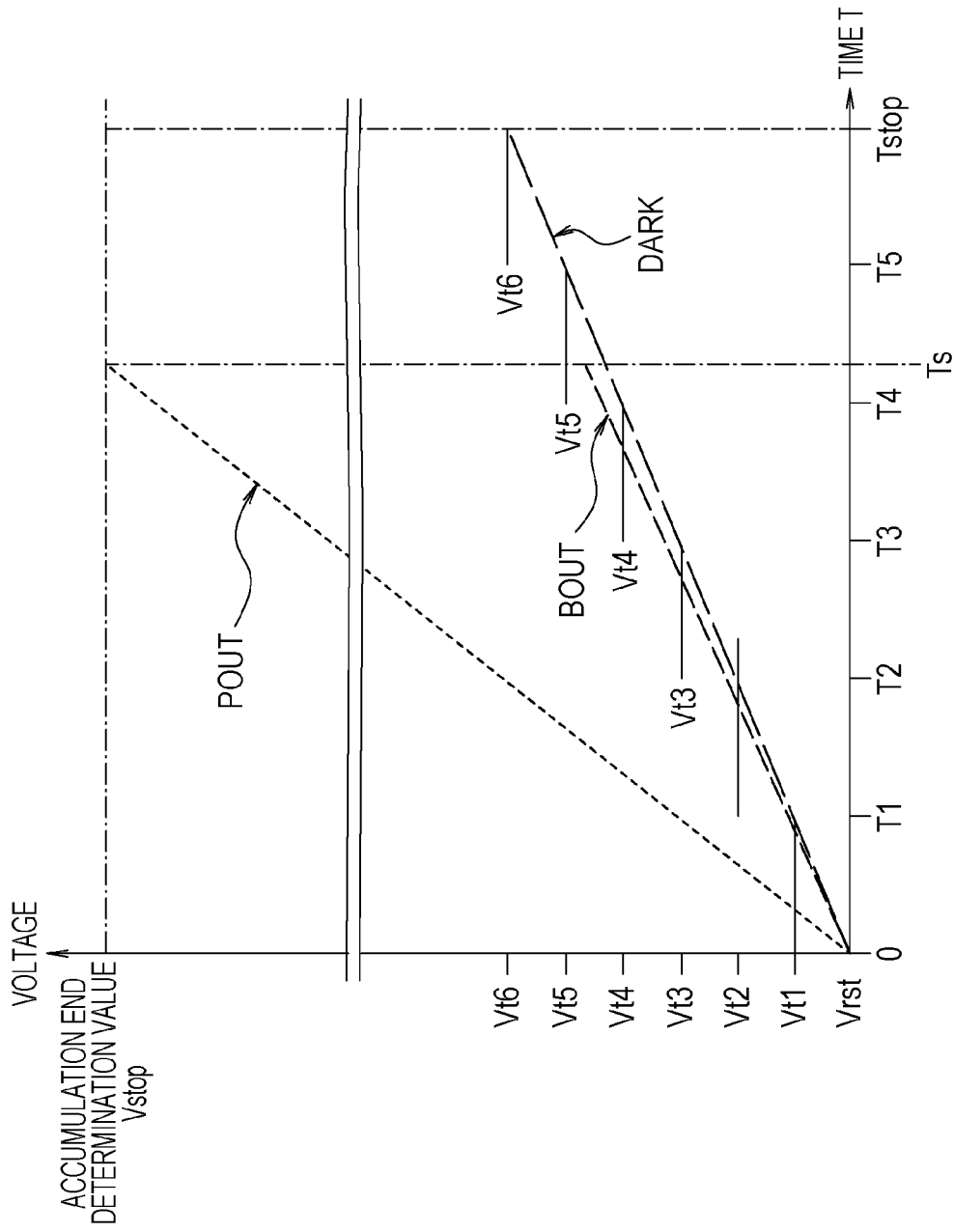
FIG. 6 is a diagram illustrating the relationship between a peak signal and a bottom signal.

Here, the relationship between the peak signal POUT and the bottom signal BOUT relative to a charge accumulation period in the first operation mode will be described with reference to FIG. 6. FIG. 6 is a graph illustrating a state in which the peak signal POUT reaches the accumulation end determination value Vstop at a time Ts and accumulation is terminated. When a time T is 0, that is, a charge accumulation period is 0, all integral values of the memory units 104 of the line sensor L1 correspond to the reset voltage Vrst. Therefore, the peak signal POUT and the bottom signal BOUT output the predetermined reset voltage Vrst.

The integral values of the memory units 104 change with time in accordance with the object, and when the peak signal POUT reaches the accumulation end determination value Vstop at the time Ts, the charge accumulation operation is terminated. In FIG. 6, a dark signal DARK corresponds to an output value obtained when the focus detection sensor 205 is set to a light blocking state (dark state) in the first operation mode. Dark current components of the photoelectric conversion units 101 and leakage currents of the resetting units 103 and the transfer units 102 are main components of the dark signal DARK. Voltages Vt1 to Vt6 are values obtained by sampling the dark signal DARK at the charge accumulation periods T1 to Tstop, respectively, and represent mode switching determination values. Specifically, a dark signal on which noise components generated in the memory units 104 in the charge accumulation period are superimposed is stored as a discrete value in advance.

If the charge accumulation period is long, AF accuracy may be deteriorated due to blur of the object generated during the charge accumulation, and therefore, the time Tstop for stopping the charge accumulation is set. Even when the peak signal POUT is smaller than the accumulation end determination value Vstop, the charge accumulation operation of the line sensor L1 may be forcibly terminated by external communication (for example, communication from a main controller of a camera or the like) performed when the time Tstop is reached after the start of the accumulation.

The mode switching determination value storage unit 113 stores mode switching determination values Vt1 to Vt6 corresponding to various accumulation periods Ts as illustrated in FIG. 10. The mode switching determination value storage unit 113 selects one of the mode switching determination values Vt1 to Vt6 corresponding to an accumulation end time TSDATA1 of the register 900 and outputs the selected one of the mode switching determination values Vt1 to Vt6 to the mode switching determination unit 112.

The mode switching determination unit 112 includes a comparator not illustrated. The comparator has one input terminal which receives the bottom signal (first detection signal) BOUT output from the bottom detection circuit 105 and the other input terminal which receives the selected one of the mode switching determination values Vt1 to Vt6. When a comparison result represents that the bottom signal BOUT is equal to or smaller than the selected one of the mode switching determination values Vt1 to Vt6, the mode switching determination unit 112 outputs 1 as a signal MODE1 and otherwise outputs 0. Specifically, when the bottom signal BOUT is equal to or smaller than the selected one of the mode switching determination values Vt1 to Vt6, the second operation mode is set and otherwise the first operation mode is set. The value of the signal MODE1 is written in the register MODE1 of the register 900.

In the case of FIG. 6, for example, at the time Ts in which the peak signal POUT reaches the accumulation end determination value Vstop, the bottom signal BOUT is smaller than the mode switching determination value Vt5, and therefore, the mode switching determination unit 112 outputs 1 as the signal MODE1. Specifically, the mode switching determination unit 112 performs switching from the first operation mode to the second operation mode when the bottom signal BOUT is so small that the dark signal DARK is not negligible. In the second operation mode, since noise generated in the resetting units 103 and the like in the charge accumulation period is not superimposed, a signal having less noise is obtained when compared with the first operation mode. Accordingly, accuracy of the focus detection may be enhanced.

Although the mode switching determination values are discretely set for the accumulation periods Ts, lamp signals proportional to the accumulation periods Ts may be used. Specifically, in the first operation mode, the dark signal DARK is generated when the focus detection sensor 205 is set to a light blocking state (dark state) as a lamp signal to be supplied to the mode switching determination value storage unit 113.

Figure 7:
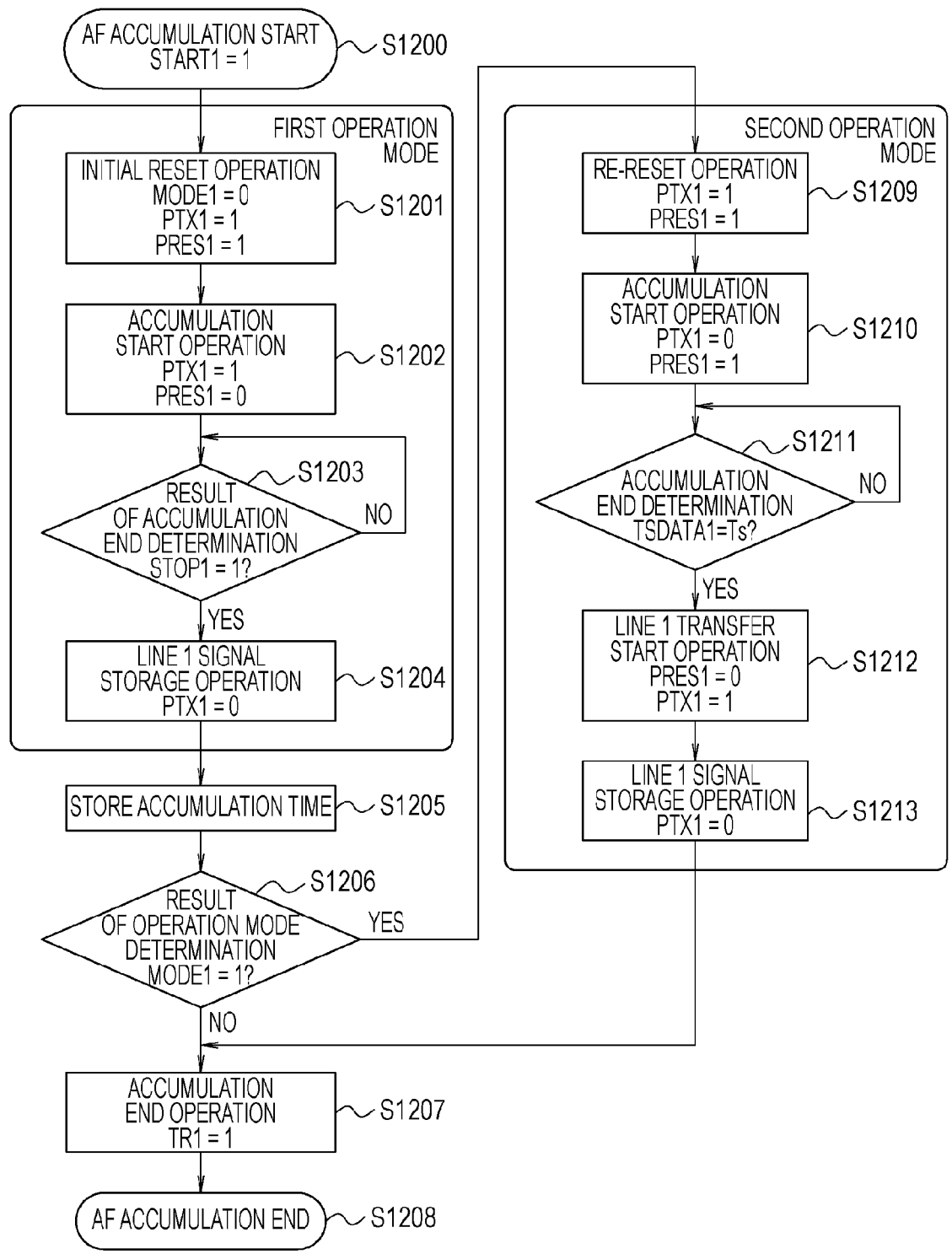
FIG. 7 is a flowchart illustrating an accumulation operation of the focus detection sensor.

Next, the accumulation operation performed by the focus detection sensor 205 will be described in detail with reference to a flowchart of FIG. 7. First, in step S1200, when 1 is externally set (by a main controller of a camera or the like) to the register START1 of the register 900, the AF controller 100 starts operation of the line sensor L1.

In step S1201, the AF controller 100 sets 0 to the register MODE1 so as to set the first operation mode to the line sensor L1. Furthermore, the signals PTX1 and PRES1 are brought to a high level so that an initial reset operation of the line sensor L1 is performed, and charges of the photoelectric conversion units 101 and the memory units 104 are reset.

In step S1202, the AF controller 100 brings the signal PRES1 to a low level so as to terminate the reset operation, and simultaneously, starts an accumulation operation. Here, since the signal PTX1 maintains the high level in the AF controller 100, the transfer units 102 are in a transfer state. Specifically, during a charge accumulation period, signal charges obtained by photoelectric conversion performed by the photoelectric conversion units 101 are accumulated in the memory units 104 through the transfer units 102 and converted into voltages.

In step S1203, the accumulation end determination unit 110 performs an accumulation end determination, and sets a result of the determination to the register STOP1. Specifically, the accumulation end determination unit 110 determines whether the accumulation is to be terminated in accordance with a result of a determination as to whether the peak signal POUT of the line sensor L1 has reached the accumulation end determination value Vstop or a result of a determination as to whether the accumulation period Is has reached the accumulation end time Tstop. When 0 is set to the register STOP1, the determination operation is repeatedly performed until 1 is set to the register STOP1.

When 1 is set to the register STOP1, the AF controller 100 brings the signal PTX1 to a low level so that the charge accumulation operation of the line sensor L1 is terminated and the memory units 104 store the signal charges in step S1204.

In step S1205, the AF controller 100 causes the accumulation end time register TSDATA1 to store the time Ts when the charge accumulation is terminated.

In step S1206, the mode switching determination unit 112 compares the bottom signal BOUT output from the bottom detection circuit 105 with a selected one of the mode switching determination values Vt1 to Vt6. When the bottom signal BOUT is equal to or smaller than the selected one of the determination values Vt1 to Vt6, the mode switching determination unit 112 outputs 1 as the signal MODE1 and sets 1 to the register MODE1. When the bottom signal BOUT is larger than the selected one of the determination values Vt1 to Vt6, the mode switching determination unit 112 outputs 0 as the signal MODE1 and sets 0 to the register MODE1.

When 0 is set to the register MODE1, the charge accumulation operation of the line sensor L1 is terminated, and in step S1207, 1 is set to an accumulation end flag register TR1.

When 1 is set to the register MODE1, the AF controller 100 brings the signal PTX1 and the signal PRES1 to a high level in step S1209 so that the reset operation of the line sensor L1 is performed again.

In step S1210, the AF controller 100 brings the signal PTX1 to a low level and terminates the re-reset operation, and simultaneously, starts an accumulation operation. Here, since the AF controller 100 brings the signal PTX1 to a low level, the transfer units 102 are in a non-transfer state. Specifically, signal charges obtained through photoelectric conversion performed by the photoelectric conversion units 101 during the charge accumulation period are accumulated in the photoelectric conversion units 101. Meanwhile, since the AF controller 100 maintains the signal PRES1 in a high level, the memory units 104 are repeatedly reset even during the charge accumulation. Therefore, the peak detection circuit 106 and the bottom detection circuit 105 do not function.

Next, in step S1211, the AF controller 100 performs an accumulation end determination. Specifically, the AF controller 100 determines that the accumulation is to be terminated when the accumulation end time in the first operation mode performed for the first time in the line sensor L1 is stored in the register TSDATA1 in step S1205 and the accumulation period Ts matches the accumulation end time TSDATA1. In step S1211, the AF controller 100 repeatedly performs the determination operation until the accumulation period Ts matches the accumulation end time TSDATA1. Specifically, the accumulation period in the second operation mode is the same as that used for the accumulation end determination in step S1203.

When the accumulation period Ts matches the accumulation end time TSDATA1, the AF controller 100 brings the signal PRES1 to a low level so as to cancel the reset state of the memory units 104, and thereafter, brings the signal PTX1 to a high level so as to bring the transfer units 102 to a transfer state in step S1212. By this, the signal charges accumulated in the photoelectric conversion units 101 are transferred to the memory units 104 by the transfer units 102.

In step S1213, the AF controller 100 brings the signal PTX1 to a low level so as to cause the transfer units 102 to be in a non-transfer state, and the memory units 104 store the signal charges.

In step S1207, the AF controller 100 sets 1 to the accumulation end flag register TR1 so as to terminate the accumulation operation of the line sensor L1.

As described above, in the flowchart of FIG. 7, only the operation of the line sensor L1 is described. However, the line sensors L2 and L3 similarly operate, and signal lines provided for the line sensors L2 and L3 similarly operate.

As described above, according to this embodiment, the focus detection operation is performed in the first operation mode in which, first, signal charges are transferred from the photoelectric conversion units 101 to the memory units 104 in the charge accumulation period and the signal charges are integrated by the memory units 104. In the first operation mode, if the bottom signal BOUT is so small that noise generated in the resetting units 103 is not negligible when the accumulation is terminated, the focus detection operation is performed after the first operation mode is switched to the second operation mode. In the second operation mode, the signal charges are not transferred from the photoelectric conversion units 101 to the memory units 104 in the charge accumulation period and the signal charges are integrated by the photoelectric conversion units 101. Furthermore, the memory units 104 are repeatedly reset until the signal charges are read. The focus detection sensor 205 may obtain an output signal including little noise on which noise components generated in the resetting units 103 are not superimposed since the first operation mode is switched to the second operation mode, and accordingly, accuracy of focus detection may be enhanced.

Second Exemplary Embodiment

Next, a second exemplary embodiment of the present invention will be described. In the first exemplary embodiment, the determination of mode switching is made in accordance with the bottom signal BOUT output from the bottom detection circuit 105. However, in the second exemplary embodiment, a determination of mode switching is made in accordance with a peak signal POUT output from a peak detection circuit 106. Since a configuration and operation of a focus detection sensor 205 and arrangement of line sensors L1 to L3 are the same as those of the first exemplary embodiment, redundant descriptions are omitted.

Figure 8:
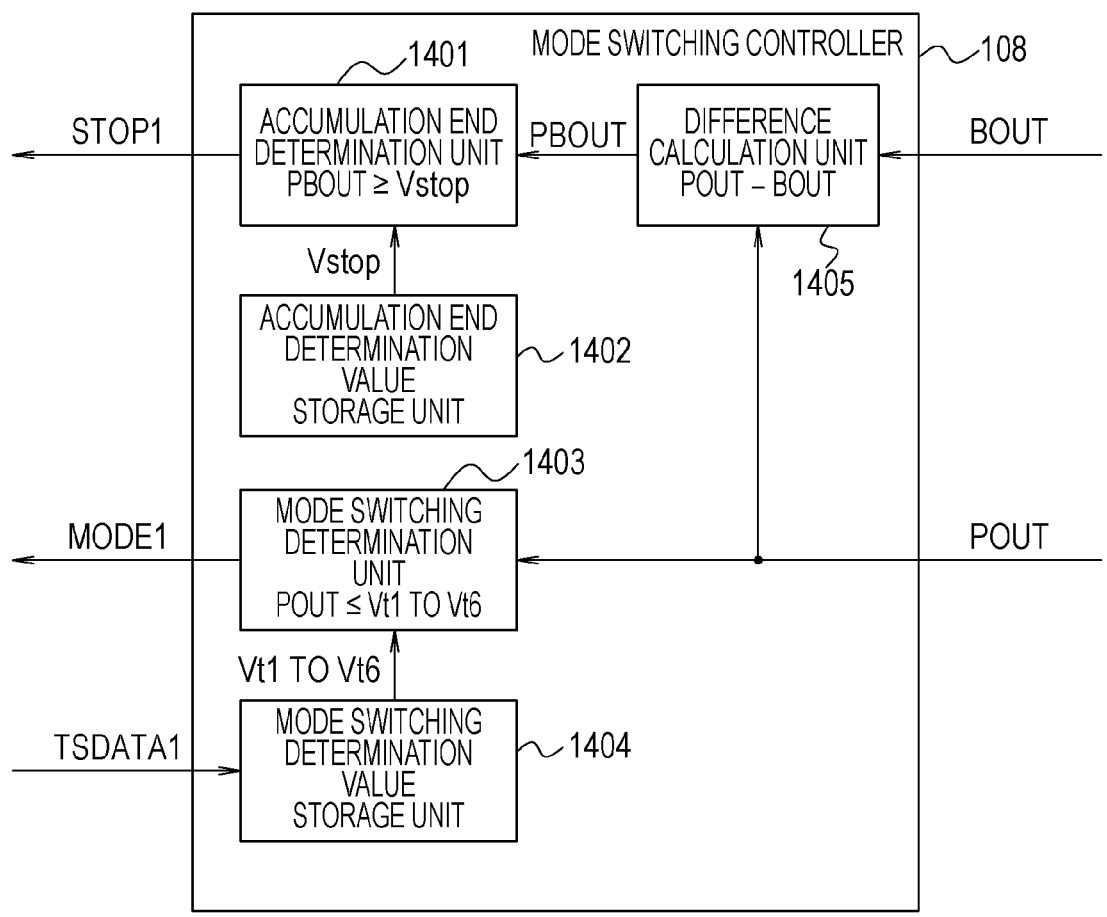
FIG. 8 is a block diagram illustrating an example of a configuration of a mode switching controller according to a second exemplary embodiment.

FIG. 8 is a block diagram illustrating a configuration of a mode switching controller 108 according to the second exemplary embodiment. The mode switching controller 108 includes an accumulation end determination unit 1401, an accumulation end determination value storage unit 1402, a mode switching determination unit 1403, a mode switching determination value storage unit 1404, and a difference calculation unit 1405. The difference calculation unit (detection unit) 1405 outputs a difference value POUT-BOUT between a peak signal POUT output from the peak detection circuit 106 and a bottom signal BOUT output from a bottom detection circuit 105 as a signal PBOUT. The accumulation end determination value storage unit 1402 stores a contrast value (the difference between the peak signal POUT and the bottom signal BOUT) used to calculate a focus state (defocusing amount) as an accumulation end determination value Vstop. Specifically, when the contrast value reaches the accumulation end determination value Vstop, the line sensor L1 determines that calculation of the defocusing value is available and accumulation is terminated.

The accumulation end determination unit 1401 includes a comparator not illustrated. The comparator has one input terminal which receives the difference signal (second detection signal) PBOUT output from the difference calculation unit 1405 and the other input terminal which receives the accumulation end determination value Vstop. When a comparison result represents that the difference signal PBOUT is equal to or larger than the accumulation end determination value Vstop, the accumulation end determination unit 1401 outputs 1 as a signal STOP1 and otherwise outputs 0. The value of the signal STOP1 is written in a register STOP1 of a register 900. An AF controller 100 stops the accumulation operation by controlling transfer units 102 when 1 is set in the accumulation end register STOP1.

Figure 9:
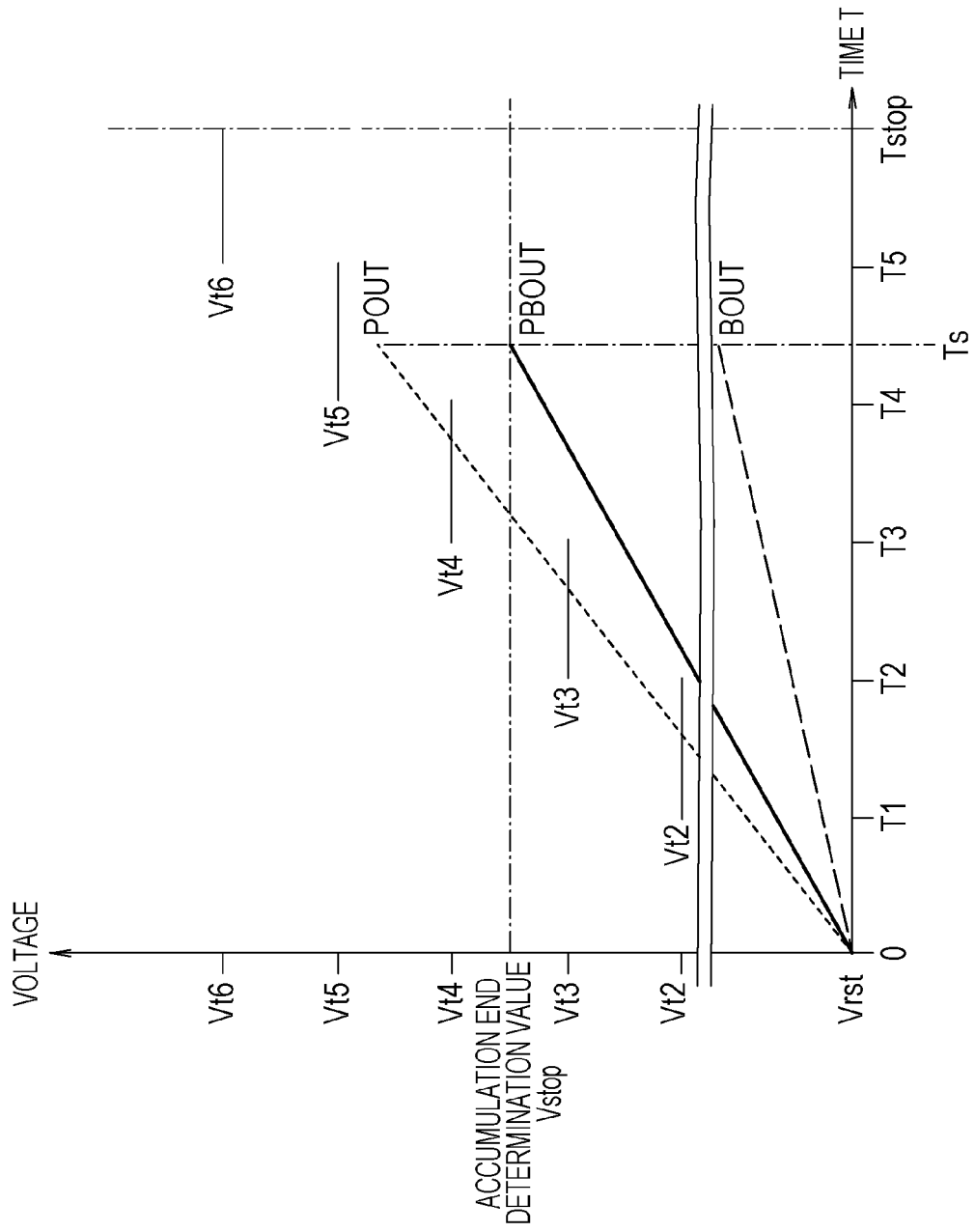
FIG. 9 is a diagram illustrating the relationship of a peak signal, a bottom signal, and a difference signal according to the second exemplary embodiment.

Here, the relationship among the peak signal POUT, the bottom signal BOUT, and the difference signal PBOUT relative to an accumulation period in a first operation mode will be described with reference to FIG. 9. FIG. 9 is a graph illustrating a state in which the difference signal PBOUT reaches the accumulation end determination value Vstop at a time Ts and accumulation is terminated.

When a time T is 0, that is, an accumulation period is 0, all integral values of memory units 104 of the line sensor L1 correspond to a reset voltage Vrst, and therefore, the peak signal POUT and the bottom signal BOUT output the predetermined reset voltage Vrst. The integral values of the memory units 104 change with time in accordance with an object, and when the difference signal PBOUT reaches the accumulation end determination value Vstop at the time Ts, the accumulation operation is terminated. In FIG. 9, voltages Vt1 to Vt6 (Vt1 is not illustrated) represent mode switching determination values. In the first operation mode, when an amount of light which reaches a pixel saturation output at an accumulation end time Tstop is irradiated to the focus detection sensor 205, values output from the peak detection circuit 106 are sampled for individual accumulation periods and stored in advance as the mode switching determination values Vt1 to Vt6.

If the accumulation period is long, AF accuracy may be deteriorated due to blur of the object generated during the charge accumulation, and therefore, the accumulation end time Tstop is set. Even when the difference signal PBOUT is smaller than the accumulation end determination value Vstop, the accumulation operation of the line sensor L1 may be forcibly terminated by communication performed by a camera controller when the accumulation end time Tstop is reached after the start of the accumulation.

The mode switching determination value storage unit 1404 stores the mode switching determination values Vt1 to Vt6 corresponding to various accumulation periods Ts as illustrated in FIG. 10. The mode switching determination value storage unit 1404 selects one of the mode switching determination values Vt1 to Vt6 corresponding to an accumulation end time TSDATA1 of the register 900 and outputs the selected one of the mode switching determination values Vt1 to Vt6 to the mode switching determination unit 1403.

The mode switching determination unit 1403 includes a comparator not illustrated. The comparator has one input terminal which receives a peak signal (first detection signal) POUT output from the peak detection circuit 106 and the other input terminal which receives the selected one of the mode switching determination values Vt1 to Vt6. When a comparison result represents that the peak signal POUT is equal to or smaller than the selected one of the mode switching determination values Vt1 to Vt6, the mode switching determination unit 1403 outputs 1 as a signal MODE1 and otherwise outputs 0. Specifically, when the bottom signal POUT is equal to or smaller than the selected one of the mode switching determination values Vt1 to Vt6, the second operation mode is set and otherwise the first operation mode is set. The value of the signal MODE1 is written in a register MODE1 of the register 900.

In the case of FIG. 9, for example, at the time Ts in which the difference signal PBOUT reaches the accumulation end determination value Vstop, the peak signal POUT is smaller than the mode switching determination value Vt5, and therefore, the mode switching determination unit 1403 outputs 1 as a signal MODE1. In the first operation mode, when a value output from the peak detection circuit 106 is smaller than a predetermined value, that is, when a low signal is output and adverse effect of noise is not negligible since an entire object is dark, the mode switching determination unit 1403 performs switching from the first operation mode to the second operation mode. In the second operation mode, since noise generated in the memory units 104 in the accumulation period is not superimposed on a signal, and therefore, the signal having little noise is obtained when compared with the first operation mode, accuracy of the focus detection may be enhanced.

Although the mode switching determination values are discretely set for the accumulation periods Ts, lamp signals proportional to the accumulation periods Ts may be used. Specifically, in the first operation mode, when an amount of light which reaches a pixel saturation output at the accumulation end time Tstop is irradiated to the focus detection sensor 205, a signal output from the peak detection circuit 106 may be generated as a lamp signal to be input to the mode switching determination unit 1403.

Next, the accumulation operation performed by the focus detection sensor 205 will be described with reference to the flowchart of FIG. 7. Note that only operations in steps which are different from those of the first exemplary embodiment will be described in detail, and detailed descriptions of steps which are the same as those of the first exemplary embodiments are omitted.

In step S1200, when 1 is externally set (by a main controller of a camera or the like) to a register START1 of the register 900, the AF controller 100 starts operation of the line sensor L1.

In step S1201, the AF controller 100 performs an initial reset operation of the line sensor L1. In step S1202, the AF controller 100 performs an accumulation start operation. In step S1203, the accumulation end determination unit 1401 performs an accumulation end determination, and sets a result of the determination to the register STOP1. The accumulation end determination unit 1401 determines whether the accumulation is to be terminated in accordance with a result of a determination as to whether the difference signal PBOUT of the line sensor L1 has reached the accumulation end determination value Vstop or a result of a determination as to whether the accumulation period Ts has reached the accumulation end time Tstop. When 0 is set to the register STOP1, the determination operation is repeatedly performed until 1 is set to the register STOP1.

When 1 is set to the register STOP1, the AF controller 100 brings a signal PTX1 to a low level so that the accumulation operation of the line sensor L1 is terminated and the memory units 104 store signal charges in step S1204. In step S1205, the AF controller 100 causes an accumulation end time register TSDATA1 to store the time Ts when the accumulation is terminated.

In step S1206, the mode switching determination unit 1403 compares the peak signal POUT output from the peak detection circuit 106 with a selected one of the mode switching determination values Vt1 to Vt6. When the peak signal POUT is equal to or smaller than the selected one of the determination values Vt1 to Vt6, the mode switching determination unit 1403 outputs 1 as the signal MODE1 and sets 1 to the register MODE1. When the peak signal POUT is larger than the selected one of the determination values Vt1 to Vt6, the mode switching determination unit 1403 outputs 0 as the signal MODE1 and sets 0 to the register MODE1. When 0 is set to the register MODE1, the accumulation operation of the line sensor L1 is terminated, and in step S1207, 1 is set to an accumulation end flag register TR1 and the operation is terminated.

When 1 is set to the register MODE1, the AF controller 100 brings the signal PTX1 and a signal PRES1 to a high level in step S1209 so that the reset operation of the line sensor L1 is performed again. The AF controller 100 performs an accumulation start operation in step S1210 and performs an accumulation end determination in step S1211. In step S1211, the AF controller 100 repeatedly performs the determination operation until the accumulation period Ts matches the accumulation end time TSDATA1. Specifically, the accumulation period in the second operation mode is the same as that used for the accumulation end determination in step S1203.

When the accumulation period Ts matches the accumulation end time TSDATA1 in step S1211, the AF controller 100 brings the signal PRES1 to a low level so as to cancel the reset state of the memory units 104 in step S1212. Thereafter, the AF controller 100 brings the signal PTX1 to a high level and causes the transfer units 102 to be in a transfer state. The signal charges accumulated in the photoelectric conversion units 101 are transferred to the memory units 104 by the transfer units 102 in step S1212. In step S1213, the AF controller 100 performs a signal holding operation of the line sensor L1. In step S1207, the AF controller 100 sets 1 to the accumulation end flag register TR1 so as to terminate the accumulation operation of the line sensor L1.

As described above, according to this embodiment, the focus detection operation is performed in the first operation mode in which, first, signal charges are transferred from the photoelectric conversion units 101 to the memory units 104 in the charge accumulation period and the signal charges are integrated by the memory units 104. When the accumulation is terminated in the first operation mode, if the peak signal POUT is smaller than a desired value since the entire object is dark, the focus detection operation is performed after the first operation mode is switched to the second operation mode. In the second operation mode, the signal charges are not transferred from the photoelectric conversion units 101 to the memory units 104 in the charge accumulation period and the signal charges are integrated by the photoelectric conversion units 101. Furthermore, the memory units 104 are repeatedly reset until the signal charges are read. The focus detection sensor 205 may obtain an output signal including little noise on which noise components generated in the memory units 104 are not superimposed since the first operation mode is switched to the second operation mode, and accordingly, accuracy of focus detection may be enhanced even when the entire object is dark.

Third Exemplary Embodiment

Next, a third exemplary embodiment of the present invention will be described. In a third exemplary embodiment, a mode switching determination is performed using a difference signal PBOUT between a peak signal POUT output from a peak detection circuit 106 and a bottom signal BOUT output from a bottom detection circuit 105. A configuration and operation of a focus detection sensor 205 and arrangement of line sensors L1 to L3 are the same as those of the first exemplary embodiment, and redundant descriptions are omitted.

Figure 11:
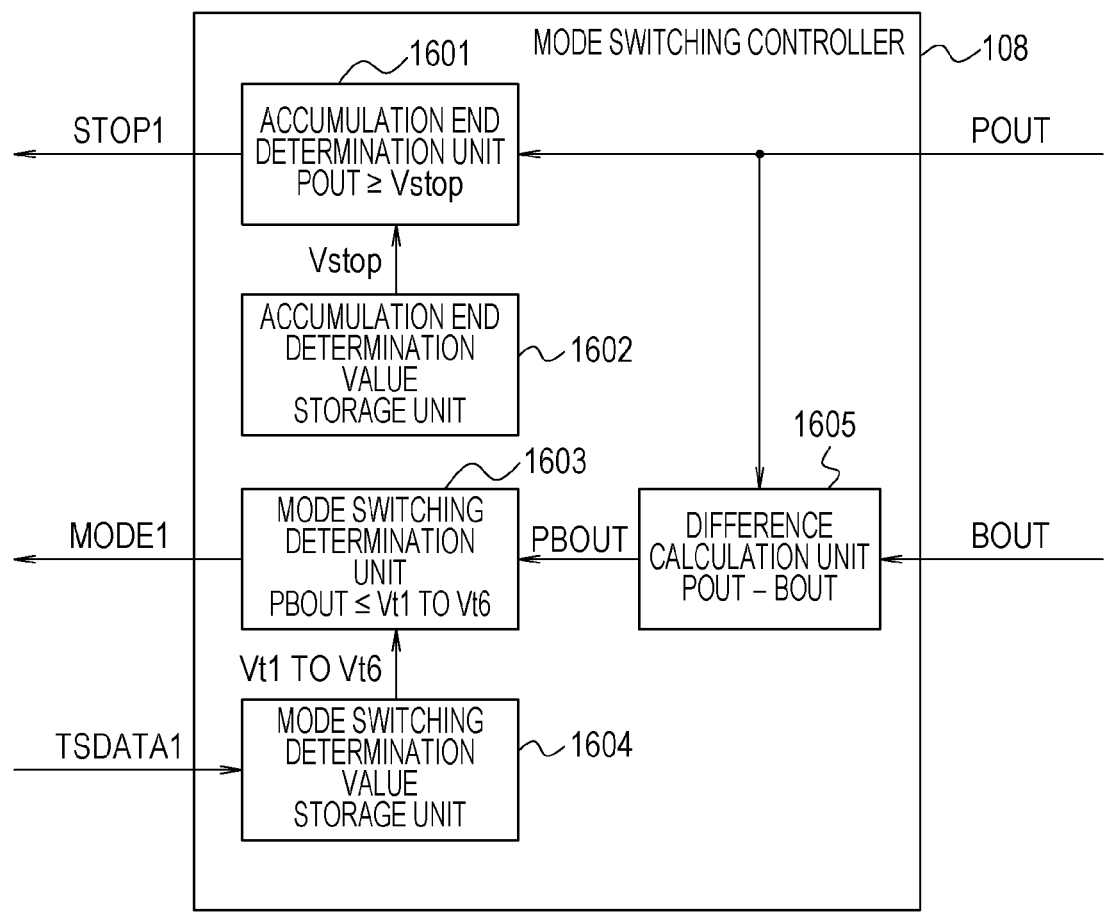
FIG. 11 is a block diagram illustrating an example of a configuration of a mode switching controller according to a third exemplary embodiment.

FIG. 11 is a block diagram illustrating an example of a configuration of a mode switching controller 108 according to the third exemplary embodiment. The mode switching controller 108 includes an accumulation end determination unit 1601, an accumulation end determination value storage unit 1602, a mode switching determination unit 1603, a mode switching determination value storage unit 1604, and a difference calculation unit 1605. The difference calculation unit (detection unit) 1605 outputs a difference value POUT-BOUT between the peak signal POUT output from the peak detection circuits 106 and the button signal BOUT output from the bottom detection circuits 105 as the signal PBOUT. The accumulation end determination value storage unit 1602 stores an accumulation end determination value Vstop. The accumulation end determination value Vstop is equal to an output value of the line sensor L1 at a time of pixel saturation. Specifically, the accumulation end determination value Vstop is used for determining that the line sensor L1 is in a pixel saturation state when the peak signal POUT reaches the accumulation determination value Vstop and terminating the accumulation.

The accumulation end determination unit 1601 includes a comparator not illustrated. The comparator has one input terminal which receives the peak signal (second detection signal) POUT output from the peak detection circuit 106 and the other input terminal which receives the accumulation end determination value Vstop. When a comparison result represents that the peak signal POUT is equal to or larger than the accumulation end determination value Vstop, the accumulation end determination unit 1601 outputs 1 as a signal STOP1 and otherwise outputs 0. The value of the signal STOP1 is written in a register STOP1 of a register 900. An AF controller 100 stops an accumulation operation by controlling transfer units 102 when 1 is set in the accumulation end register STOP1.

Figure 12:
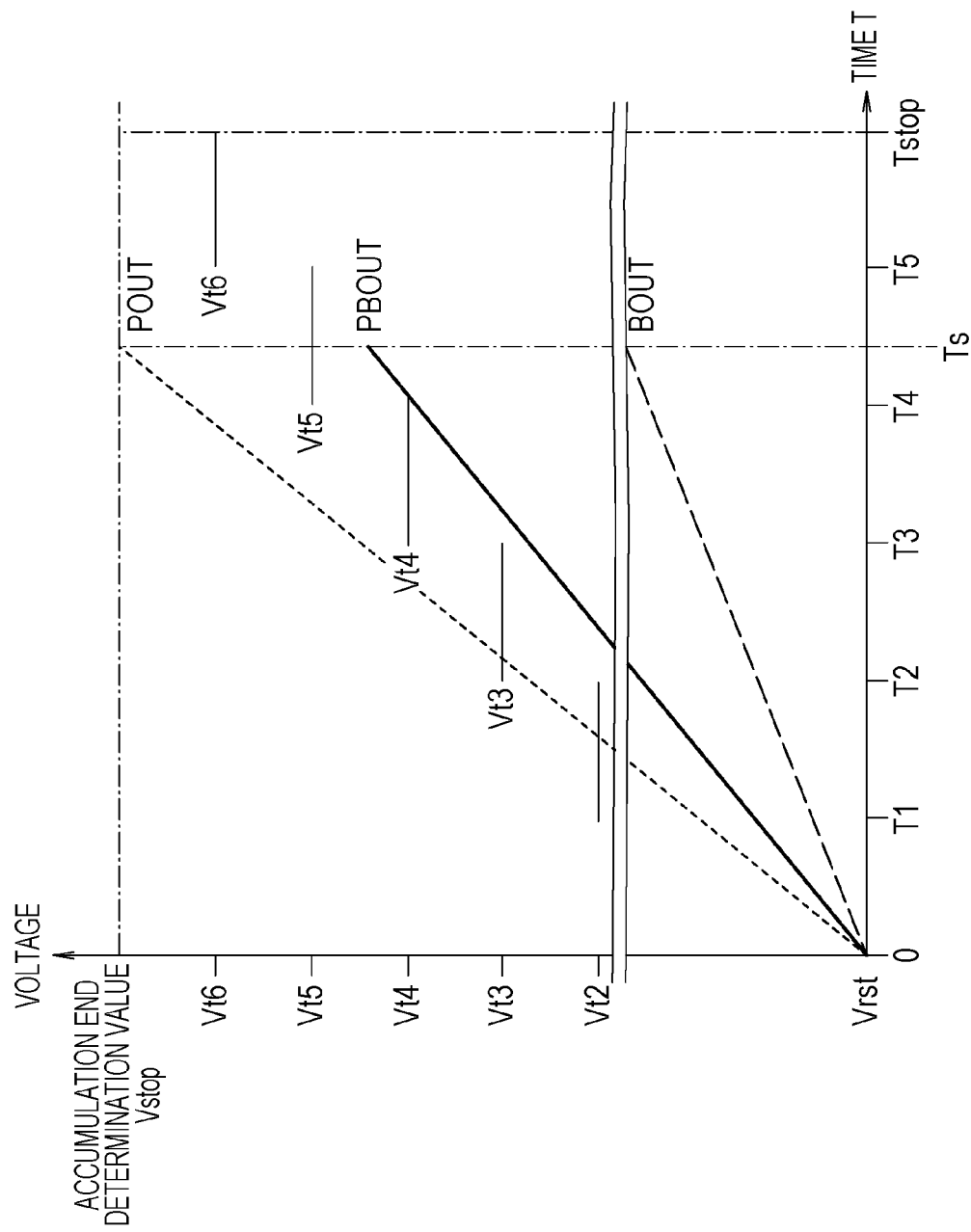
FIG. 12 is a diagram illustrating the relationship of a peak signal, a bottom signal, and a difference signal according to the third exemplary embodiment.

Here, the relationship among the peak signal POUT, the bottom signal BOUT, and the difference signal PBOUT relative to an accumulation period in a first operation mode will be described with reference to FIG. 12. FIG. 12 is a graph illustrating a state in which the peak signal POUT reaches the accumulation end determination value Vstop at a time Ts and accumulation is terminated.

When a time T is 0, that is, the accumulation period is 0, all integral values of memory units 104 of the line sensor L1 correspond to a reset voltage Vrst, and therefore, the peak signal POUT and the button signal BOUT output the predetermined reset voltage Vrst. The integral values of the memory units 104 change with time in accordance with an object, and when the peak signal POUT reaches the accumulation end determination value Vstop at the time Ts, the accumulation operation is terminated. In FIG. 12, voltages Vt1 to Vt6 (Vt1 is not illustrated) represent mode switching determination values. The mode switching determination values Vt1 to Vt6 correspond to contrast values (differences between the peak signal POUT and the bottom signal BOUT) which are used to calculate defocusing amounts in the first operation mode and which are set for individual accumulation periods.

If the accumulation period is long, AF accuracy may be deteriorated due to blur of an object generated during the charge accumulation, and therefore, an accumulation end time Tstop is set. Even when the peak signal POUT is smaller than the accumulation end determination value Vstop, the accumulation operation of the line sensor L1 may be forcibly terminated by communication performed by a camera controller when the time Tstop is reached after the start of the accumulation.

The mode switching determination value storage unit 1604 stores mode switching determination values Vt1 to Vt6 corresponding to various accumulation periods Ts as illustrated in FIG. 10. The mode switching determination value storage unit 1604 selects one of the mode switching determination values Vt1 to Vt6 corresponding to an accumulation end time TSDATA1 of the register 900 and outputs the selected one of the mode switching determination values Vt1 to Vt6 to the mode switching determination unit 1603. The mode switching determination unit 1603 includes a comparator not illustrated. The comparator has one input terminal which receives the difference signal (first detection signal) PBOUT output from the difference calculation unit 1605 and the other input terminal which receives the selected one of the mode switching determination values Vt1 to Vt6 and compares the difference signal PBOUT with the selected one of the mode switching determination values Vt1 to Vt6. When a result of the comparison represents that the difference signal PBOUT is equal to or smaller than the selected one of the mode switching determination values Vt1 to Vt6, the mode switching determination unit 1603 outputs 1 as a signal MODE1 and otherwise outputs 0. Specifically, when the difference signal PBOUT is equal to or smaller than the selected one of the mode switching determination values Vt1 to Vt6, a second operation mode is set and otherwise the first operation mode is set. The value of the signal MODE1 is written in a register MODE1 of the register 900.

In the case of FIG. 12, for example, at the time Ts when the peak signal POUT reaches the accumulation end determination value Vstop, the difference signal PBOUT is smaller than the mode switching determination value Vt5, and therefore, the mode switching determination unit 1603 outputs 1 as the signal MODE1. Specifically, the mode switching determination unit 1603 performs switching from the first operation mode to the second operation mode when an appropriate contrast value for calculation of a defocusing amount is not obtained in the first operation mode. Note that, although the mode switching determination values Vt1 to Vt6 are set for individual accumulation periods in this embodiment, a single determination value may be uniformly set for the accumulation periods. In the second operation mode, since noise generated in the resetting units 103 in the accumulation period is not superimposed, a signal having little noise is obtained when compared with the first operation mode. Accordingly, accuracy of focus detection may be enhanced by increasing a gain at a time of reading, for example.

Next, the accumulation operation performed by the focus detection sensor 205 of this embodiment will be described in detail with reference to the flowchart of FIG. 7. Note that only steps of operations which are different from those of the first exemplary embodiment will be described in detail, and detailed descriptions of steps which are the same as those of the first exemplary embodiments are omitted.

In step S1200, when 1 is externally set to a register START1 of the register 900 (by a main controller of a camera, for example), the AF controller 100 starts operation of the line sensor L1. In step S1201, the AF controller 100 performs an initial reset operation of the line sensor L1. In step S1202, the AF controller 100 performs an accumulation start operation. In step S1203, the accumulation end determination unit 1601 performs an accumulation end determination, and sets a result of the determination to a register STOP1. Specifically, the accumulation end determination unit 1601 determines whether the accumulation is to be terminated in accordance with a result of a determination as to whether the peak signal POUT of the line sensor L1 has reached the accumulation end determination value Vstop or a result of a determination as to whether the accumulation period Ts has reached the accumulation end time Tstop, and sets a result of the determination in the register STOP1. When 0 is set to the register STOP1, the determination operation is repeatedly performed until 1 is set to the register STOP1.

When 1 is set to the register STOP1, the AF controller 100 brings a signal PTX1 to a high level so that the accumulation operation of the line sensor L1 is terminated and the memory units 104 store signal charges in step S1204. In step S1205, the AF controller 100 causes an accumulation end time register TSDATA1 to store the time Ts when the accumulation is terminated. In step S1206, the mode switching determination unit 1603 compares the difference signal PBOUT output from the difference calculation unit 1605 with a selected one of the mode switching determination values Vt1 to Vt6. When the difference signal PBOUT is equal to or smaller than the selected one of the determination values Vt1 to Vt6, the mode switching determination unit 1603 outputs 1 as the signal MODE1 and sets 1 to the register MODE1. When the difference signal PBOUT is larger than the selected one of the determination values Vt1 to Vt6, the AF controller 100 outputs 0 as the signal MODE1 and sets 0 to the register MODE1. When 0 is set to the register MODE1, the accumulation operation of the line sensor L1 is terminated, and in step S1207, 1 is set to an accumulation end flag register TR1.

When 1 is set to the register MODE1, the AF controller 100 brings the signal PTX1 and a signal PRES1 to a high level in step S1209 so that the reset operation of the line sensor L1 is performed again. The AF controller 100 performs an accumulation start operation in step S1210 and performs an accumulation end determination in step S1211. In step S1211, the AF controller 100 continuously performs the determination operation until the accumulation period Ts matches the accumulation end time TSDATA1. Specifically, the accumulation period in the second operation mode is the same as that used for the accumulation end determination in step S1203.

When the accumulation period Is matches the accumulation end time TSDATA1 in step S1211, the AF controller 100 brings the signal PRES1 to a low level so as to cancel the reset state of the memory units 104 in step S1212. Thereafter, the AF controller 100 brings the signal PTX1 to a high level and causes the transfer units 102 to be in a transfer state. In step S1212, signal charges accumulated in the photoelectric conversion units 101 are transferred to the memory units 104 by the transfer units 102. The AF controller 100 performs a signal storage operation of the line sensor L1 in step S1213 and sets 1 to the accumulation end flag register TR1 in step S1207, and then the operation is terminated.

As described above, according to this embodiment, the focus detection operation is performed in the first operation mode in which, first, signal charges are transferred from the photoelectric conversion units 101 to the memory units 104 in the charge accumulation period and the signal charges are integrated by the memory units 104. When the accumulation is terminated in the first operation mode, if an appropriate contrast value for calculating a defocusing amount is not obtained, the focus detection operation is performed after the first operation mode is switched to the second operation mode. In the second operation mode, the signal charges are not transferred from the photoelectric conversion units 101 to the memory units 104 in the charge accumulation period and the signal charges are integrated by the photoelectric conversion units 101. Furthermore, the memory units 104 are repeatedly reset until the signal charges are read. The focus detection sensor 205 may obtain an output signal including little noise on which noise components generated in the resetting units 103 are not superimposed since the first operation mode is switched to the second operation mode, and accordingly, accuracy of focus detection may be enhanced by increasing a gain at a time of reading, for example.

Fourth Exemplary Embodiment

Figure 13:
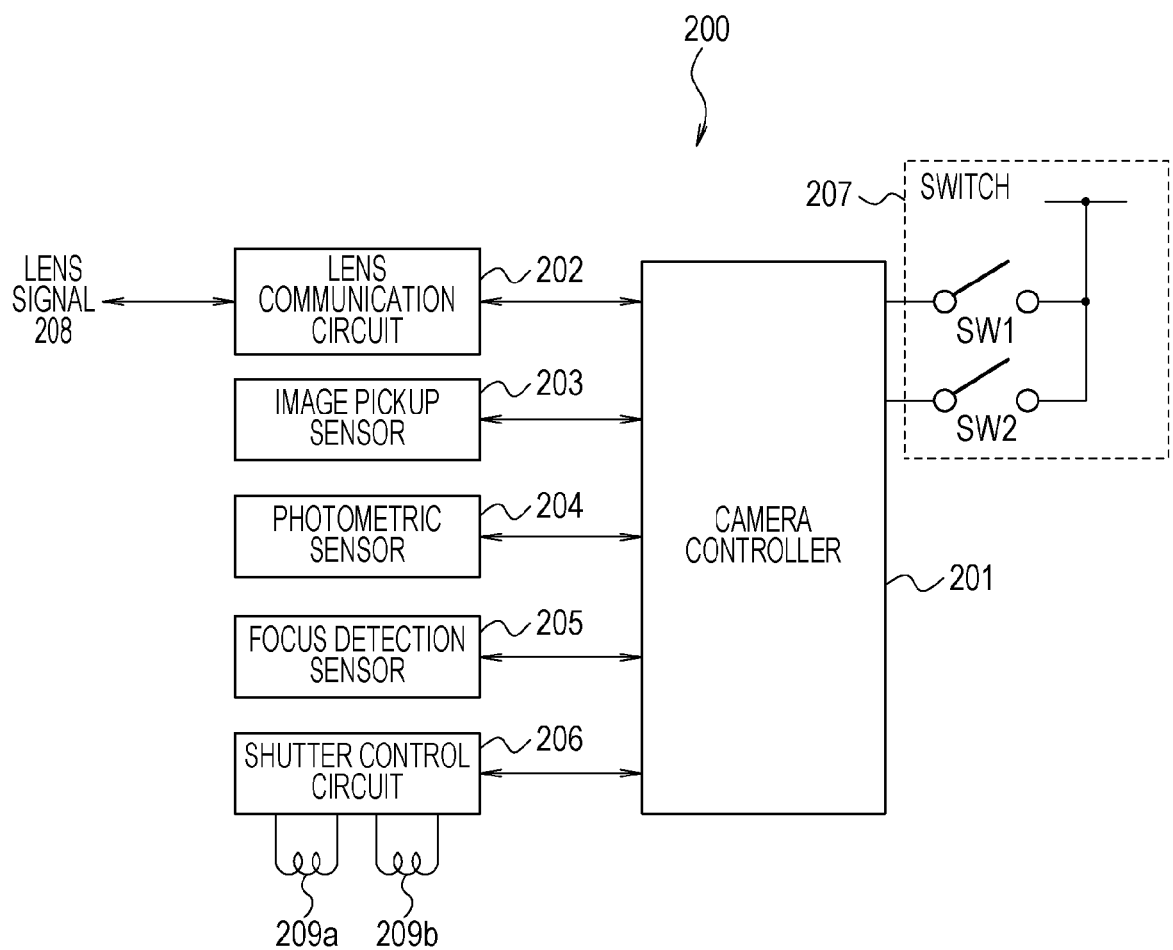
FIG. 13 is a block diagram illustrating an example of a configuration of a camera.

FIG. 13 is a block diagram illustrating a configuration of a camera (image pickup system) 200 which is an example of an optical device using a focus detection sensor 205 according to a fourth exemplary embodiment of the present invention. Note that, in the configuration of the camera 200, portions other than portions associated with autofocus detection are omitted. The camera 200 includes a camera controller 201, a switch 207 operating in accordance with an operation of a release button, and a lens communication circuit 202 which drives an image pickup lens. The camera 200 further includes an image pickup sensor 203, a photometric sensor 204 which measures brightness of an object, a focus detection sensor 205 which detects a focus state (defocusing amount), and a shutter control circuit 206 which controls open and close of a shutter. The switch 207 includes two switches SW1 and SW2 which are turned on/off in accordance with an operation of the release button, not illustrated. Here, the switch SW1 is turned on when the release button is pressed halfway (first stroke), and the switch SW2 is turned on when the release button is fully pressed (second stroke). Furthermore, the turning-on of the switch SW1 corresponds to an instruction for starting an image pickup preparation operation including a focus detection operation, and the turning-on of the switch SW2 corresponds to an instruction for starting an image pickup operation.

The lens communication circuit 202 transmits a lens signal 208 to and receives the lens signal 208 from the image pickup lens, not illustrated, under control of the camera controller 201, and controls a focusing lens of the image pickup lens and aperture of the image pickup lens. The shutter control circuit 206 controls open and close of the shutter by controlling current-carrying times of electromagnets 209a and 209b included in a shutter mechanism, not illustrated, under control of the camera controller 201. The focus detection sensor 205 includes three line sensors L1 to L3 as described above and detects a focus state (defocusing amount) of the image pickup lens in accordance with a phase difference among signal images (image signals A and B) output from the line sensors L1 to L3.

The camera controller 201 includes a read only memory (ROM) which stores programs, a random access memory (RAM) which stores variables, and an electrically erasable programmable read only memory (EEPROM) which stores various parameters, which are not illustrated. The camera controller 201 controls entire operation of the camera 200 by controlling the units in accordance with the programs. When the switch SW2 is turned on, the camera controller 201 detects brightness of an object by controlling the photometric sensor 204 and determines an image pickup condition including an aperture value and a shutter speed of the image pickup lens in accordance with the brightness of the object. Furthermore, the camera controller 201 communicates with the lens communication circuit 202 and the shutter control circuit 206 so as to expose the image pickup sensor 203 under the determined image pickup condition. Thereafter, the camera controller 201 performs a series of image pickup operations including an operation of reading charges accumulated by the image pickup sensor 203 and an operation of performing image processing so as to generate data of a captured image, and an operation of recording the data in a recording medium, not illustrated.

Figure 14:
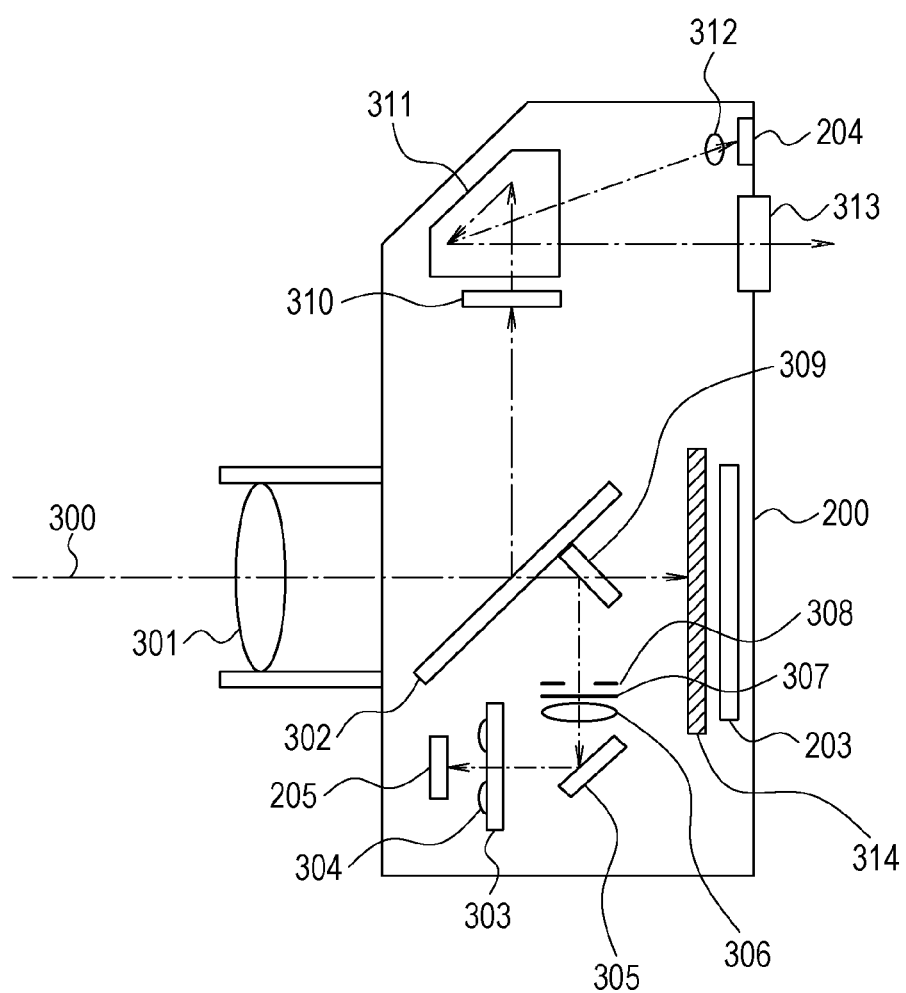
FIG. 14 is a diagram illustrating optical parts and an example of arrangement of the optical parts.

FIG. 14 is a diagram illustrating optical components included in the camera 200 and an example of arrangement of the optical components viewed from a side of the camera 200. Note that an image pickup lens 301 illustrated in FIG. 14 may be detachable. Most portions of a light beam 300 emitted from the object through the image pickup lens 301 is reflected upward by a quick-return mirror 302 so that an image is formed on a finder screen 310. A photographer monitors the image of the object formed on the finder screen 310 through a pentaprism 311 and an eyepiece 313. A photometric image forming lens 312 and a photometric sensor 204 are disposed above the eyepiece 313. The photometric sensor 204 may measure the brightness of the object by receiving light of the image of the object formed on the finder screen 310 through the photometric image forming lens 312.

Meanwhile, a portion of the light beam 300 which is emitted from the image pickup lens 301 pass through the quick-return mirror 302 and led by a sub-mirror 309 disposed on a back side of the quick-return mirror 302 to a focus detection optical system disposed below the sub-mirror 309. The light beam 300 incident on the focus detection optical system forms an image on the focus detection sensor 205 through a visual field mask 308, an infrared beam cut filter 307, a field lens 306, a reflection mirror 305, an aperture 303, and a secondary image forming lens 304. The focus detection sensor 205 may detect a focus state (defocusing amount) of the image pickup lens 301 in accordance with a phase difference between image signals obtained by performing photoelectric conversion on the formed image.

When the switch SW2 of the switch 207 is turned on and an image pickup operation is to be performed, the quick-return mirror 302 turns upward so as to retract from an optical path and a focal plane shutter 314 opens. By this, the image pickup sensor 203 is exposed by the light beam 300 of the image of the object which enters from the image pickup lens 301.

Figure 15:
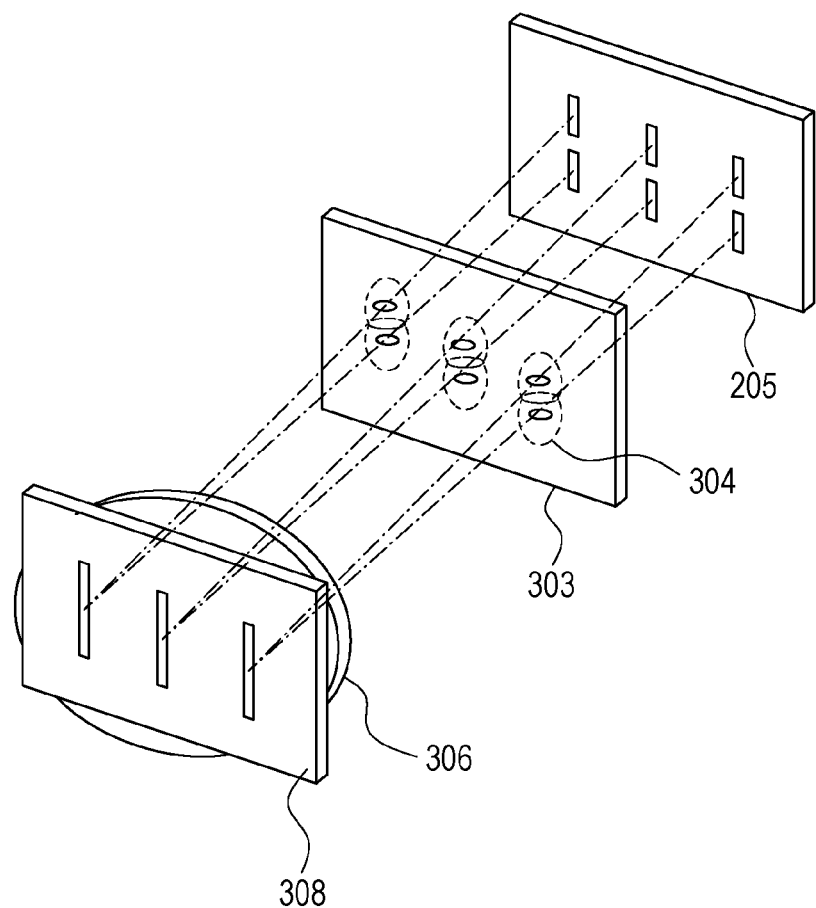
FIG. 15 is a perspective view schematically illustrating a configuration of a focus detection optical system.

FIG. 15 is a perspective view schematically illustrating a configuration of the focus detection optical system included in the camera 200. Note that, a configuration illustrated in FIG. 15 omits the reflection mirror 305 and the infrared beam cut filter 307 in the focus detection optical system illustrated in FIG. 14 for facilitating description and understanding. The light beam 300 reflected by the sub-mirror 309 temporarily forms an image in the vicinity of the visual field mask 308. The visual field mask 308 is a light blocking member used to determine a focus detection region (ranging point) in a field of view (screen) and includes vertically-long opening portions which are disposed at the center and right and left portions.

The field lens 306 includes three lenses which correspond to the three opening portions of the visual field mask 308. The aperture 303 is disposed on a back side of the field lens 306. The aperture 303 includes opening portions at the center and right and left portions corresponding to the opening portions of the visual field mask 308. The field lens 306 has a function of forming images in the opening portions of the aperture 303 in a portion in the vicinity of an exit pupil of the image pickup lens 301. The secondary image forming lens 304 is disposed on a back side of the aperture 303. The secondary image forming lens 304 includes six lenses disposed in positions corresponding to the opening portions of the aperture 303. Light beams which pass through the visual field mask 308, the field lens 306, the aperture 303, and the secondary image forming lens 304 form images on line sensors L1 to L3 included in the focus detection sensor 205.

Figure 16A:
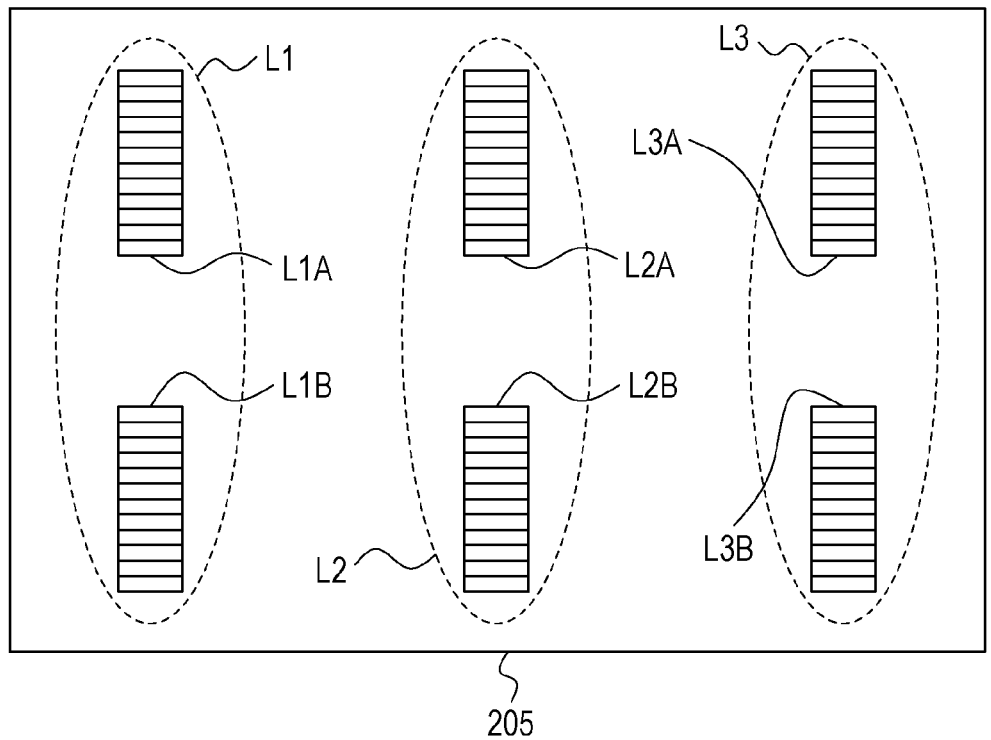
FIGS. 16A and 16B are diagrams illustrating an example of arrangement of line sensors.

FIG. 16A is a diagram illustrating an example of arrangement of the line sensors L1 to L3 of the focus detection sensor 205. The line sensors L1 to L3 include a pair of sensor arrays L1A and L1B, a pair of sensor arrays L2A and L2B, a pair of sensor arrays L3A and L3B, respectively. Each of the sensor arrays includes a plurality of pixel circuits which serve as sensors and which are linearly arranged and obtains image signals (image signals A and B) from the pixel circuits. A focus state (defocusing amount) of the image pickup lens 301 may be obtained in accordance with a phase difference between image signals obtained from the pair of sensor arrays. Each of the pairs of sensor arrays is projected in a region on a finder screen corresponding to a position of the corresponding one of the pairs of sensor arrays by the focus detection optical system such as the secondary image forming lens 304, and the region forms the ranging point.

Figure 16B:
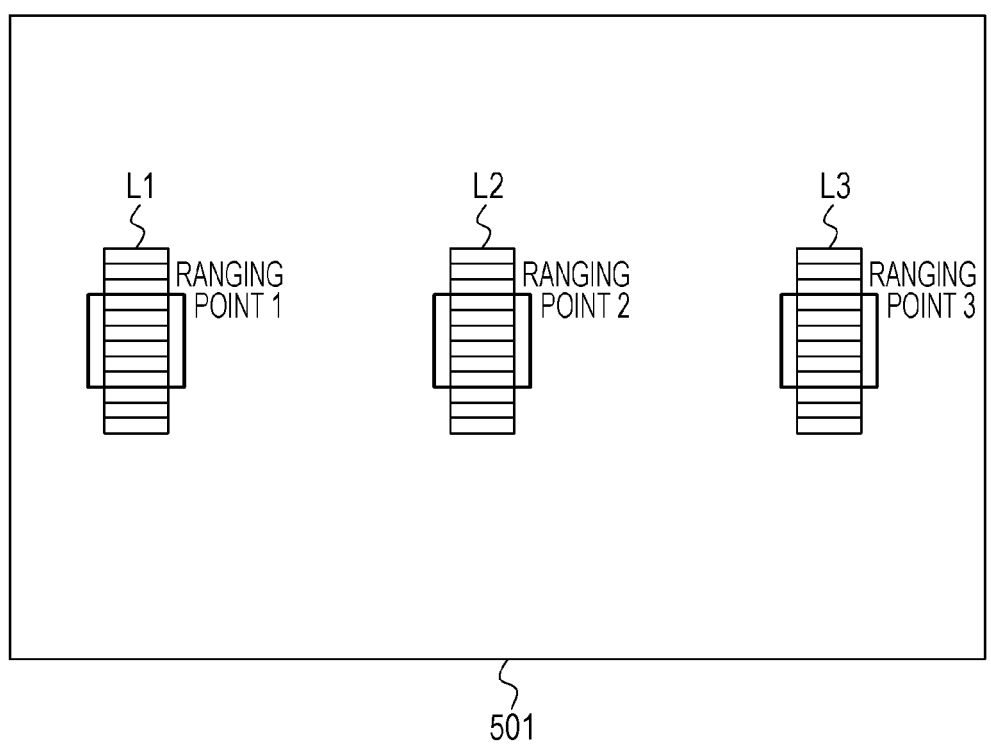

FIG. 16B is a diagram illustrating the positional relationships between ranging points 1 to 3 and the line sensors L1 to L3 in a finder screen 501 corresponding to the focus detection sensor 205 illustrated in FIG. 16A. The finder screen 501 includes three ranging points, that is, the ranging point 1 corresponding to the line sensor L1, the ranging point 2 corresponding to the line sensor L2, and the ranging point 3 corresponding to the line sensor L3. The ranging points 1 to 3 may detect the focus state of the image pickup lens 301 in accordance with contrast images in a vertical direction of an image of an object.

FIG. 17 is a flowchart illustrating an example of operation of the camera 200 including the focus detection sensor 205. This operation is executed by the camera controller 201 when the switch SW1 of the camera 200 illustrated in FIG. 13 is turned on in step S1300.

In step S1301, the camera controller 201 communicates with an AF controller 100 of the focus detection sensor 205 so as to set 1 to registers START1 to START3 of the AF controller 100 to thereby start an AF accumulation operation. By this, the focus detection sensor 205 causes the line sensors L1 to L3 to start the accumulation operation described with reference to FIG. 7.

In step S1302, the camera controller 201 determines whether the accumulation operation performed by the focus detection sensor 205 has been terminated in accordance with values of accumulation end flag registers TR1 to TR3 of the AF controller 100. When 1 is set to all the accumulation end flag registers TR1 to TR3, the accumulation operation has been terminated on all the line sensors L1 to L3, and therefore, the camera controller 201 proceeds to a process in step S1303. On the other hand, when 0 is set to at least one of the accumulation end flag registers TR1 to TR3, the camera controller 201 determines that the accumulation operation has not been performed on at least one of the line sensors L1 to L3 and the same process is repeatedly performed until end of the accumulation is detected.

In step S1303, the camera controller 201 communicates with the AF controller 100 so as to read pixel signals obtained by the line sensors L1 to L3. The AF controller 100 outputs signals SHIFT1 to SHIFT3 in response to a reading instruction, drives shift registers 107 of the line sensors L1 to L3 so as to read signals, and outputs the signals to the camera controller 201. The camera controller 201 successively performs analog/digital conversion on the pixel signals of the line sensors L1 to L3 output from the focus detection sensor 205 and stores the signals in the RAM, not illustrated.

In step S1304, the camera controller 201 calculates defocusing amounts for individual ranging points from the pixel signals of the line sensors L1 to L3 obtained in step S1303.

In step S1305, the camera controller 201 determines that a focusing state is attained when the defocusing amounts corresponding to the ranging points for a main object are within a desired range and proceeds to step S1306. On the other hand, when all the defocusing amounts are out of the desired range, in step S1312, the camera controller 201 instructs the image pickup lens 301 through the lens communication circuit 202 to drive a lens by an amount corresponding to one of the defocusing amounts of the ranging points obtained in step S1304. Thereafter, the camera controller 201 returns to the process in step S1301 and repeatedly performs the operation described above until the focusing state is attained.

Subsequently, in step S1306, the camera controller 201 detects a state of the switch SW2. When the switch SW2 is in an on state, an image pickup operation starting from step S1307 is performed. On the other hand, when the switch SW2 is in an off state in step S1306, the camera controller 201 detects a state of the switch SW1 in step S1313. When the switch SW1 is still in an on state in step S1313, the camera controller 201 performs the process in step S1301 onwards again whereas when the switch SW1 is in an off state, the camera controller 201 terminates the AF operation.

In step S1307, the camera controller 201 calculates an exposure value in accordance with a value detected by the photometric sensor 204 and determines an aperture value and a shutter speed corresponding to the exposure value.

In step S1308, the camera controller 201 causes the quick-return mirror 302 to retract from the image pickup optical path, and simultaneously, causes the image pickup lens 301 to open the aperture by an amount corresponding to the aperture value determined in step S1307 through the lens communication circuit 202.

After the quick-return mirror 302 totally retracts from the image pickup optical path, the camera controller 201 controls a shutter speed in accordance with the current-carrying times of the electromagnets 209a and 209b through the shutter control circuit 206 and exposes the image pickup sensor 203 in step S1309.

In step S1310, the camera controller 201 causes the quick-return mirror 302 to return to a position included in the image pickup optical path and terminates the image pickup operation. Thereafter, image signals accumulated in the image pickup sensor 203 are processed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-110186, filed May 24, 2013, which is hereby incorporated by reference herein in its entirety.

What is claimed is:

1. A focus detection sensor, comprising:
  a plurality of photoelectric conversion units configured to convert light into charges;
  a plurality of memory units configured to store charges generated by the photoelectric conversion units as pixel signals;
  a plurality of transfer units configured to transfer the charges generated by the photoelectric conversion units to the memory units;
  a plurality of reset units configured to reset the photoelectric conversion units and the memory units;
  a detection unit configured to output a first detection signal in accordance with the pixel signals stored in the memory units; and
  a mode switching determination unit configured to determine whether or not to switch from a first operation mode to a second operation mode based on the first detection signal which is output in the first operation mode, wherein the transfer units are set to a transfer state during a charge accumulation period after the photoelectric conversion units are reset in the first operation mode, and the transfer units are set to a non-transfer state during a charge accumulation period in the second operation mode.

2. The focus detection sensor according to claim 1, wherein the first detection signal corresponds to a smallest value of the pixel signals stored in the memory units.

3. The focus detection sensor according to claim 1, wherein the first detection signal corresponding to a largest value of the pixel signals stored in the memory units.

4. The focus detection sensor according to claim 1, wherein the first detection signal corresponds to a difference value between a smallest value and a largest value of the pixel signals stored in the memory units.

5. The focus detection sensor according to claim 1, further comprising:
  an accumulation end determination unit configured to terminate the charge accumulation period, wherein
  the detection unit outputs a second detection signal in accordance with the pixel signals stored in the memory units, and
  the accumulation end determination unit terminates the charge accumulation period in accordance with the second detection signal.

6. The focus detection sensor according to claim 5, wherein the second detection signal corresponds to a largest value of the pixel signals stored in the memory units.

7. The focus detection sensor according to claim 5, wherein the second detection signal corresponds to a difference value between a smallest value and a largest value of the pixels signals stored in the memory units.

8. An image pickup system, comprising:
  the focus detection sensor set forth in claim 1; and
  a lens configured to form an image by a light beam on the focus detection sensor.

9. A method for driving a focus detection sensor which includes a plurality of photoelectric conversion units which convert light into charges, a plurality of memory units which store the charges generated by the photoelectric conversion units as pixel signals, a plurality of transfer units which transfer the charges generated by the photoelectric conversion units to the memory units, and a plurality of reset units which reset the photoelectric conversion units and the memory units, the method comprising:
  outputting a first detection signal in accordance with the pixel signals stored in the memory units; and
  determining whether or not to switch from a first operation mode to a second operation mode based on the first detection signal which is output in the first operation mode, wherein the transfer units are set to a transfer state during a charge accumulation period after the photoelectric conversion units are reset in the first operation mode, and the transfer units are set to a non-transfer state during a charge accumulation period in the second operation mode.

10. The method for driving a focus detection sensor according to claim 9, wherein the first detection signal corresponds to a smallest value of the pixel signals stored in the memory units.

11. The method for driving a focus detection sensor according to claim 9, wherein the first detection signal corresponds to a largest value of the pixel signals stored in the memory units.

12. The method for driving a focus detection sensor according to claim 9, wherein the first detection signal corresponds to a difference value between a smallest value and a largest value of the pixel signals stored in the memory units.

13. The method for driving a focus detection sensor according to claim 9, further comprising: terminating the charge accumulation period, wherein the outputting outputs a second detection signal in accordance with the pixel signals stored in the memory units, and terminating terminates the charge accumulation period in accordance with the second detection signal.

14. The method for driving a focus detection sensor according to claim 13, wherein the second detection signal corresponds to a largest value of the pixel signals stored in the memory units.

15. The method for driving a focus detection sensor according to claim 13, wherein the second detection signal corresponds to a difference value between a smallest value and a largest value of the pixel signals stored in the memory units.

16. A focus detection sensor, comprising:
a plurality of photoelectric conversion units configured to convert light into charges;
a plurality of memory units configured to store charges generated by the photoelectric units as pixel signals;
a plurality of transfer units configured to transfer the charges generated by the photoelectric conversion units to the memory units;
a plurality of reset units configured to reset the photoelectric conversion units and the memory units;
a detection unit configured to output a first detection signal in accordance with the pixel signals stored in the memory units; and
a mode switching determination unit configured to perform switching from a first operation mode to a second operation mode, wherein the transfer units are set to a transfer state during a charge accumulation period after the photoelectric conversion units are reset in the first operation mode, and the transfer units are set to a non-transfer state during a charge accumulation period in the second operation mode, wherein
the focus detection sensor further comprising:
an accumulation end determination unit configured to terminate the charge accumulation period,
the detection unit outputs a second detection signal in accordance with the pixel signals stored in the memory units,
the accumulation end determination unit terminates the charge accumulation period in accordance with the detection signal, and
the second detection signal corresponds to a largest value of the pixel signals stored in the memory units.

* * * * *